(12) United States Patent
Zuzga

(10) Patent No.: US 11,375,738 B2
(45) Date of Patent: Jul. 5, 2022

(54) DIRT REMOVAL AND PILING MACHINE

(71) Applicant: Jonathon J. Zuzga, Sebewaing, MI (US)

(72) Inventor: Jonathon J. Zuzga, Sebewaing, MI (US)

(*) Notice: Subject to any disclaimer, the term of this patent is extended or adjusted under 35 U.S.C. 154(b) by 270 days.

(21) Appl. No.: 16/259,973

(22) Filed: Jan. 28, 2019

(65) Prior Publication Data

US 2019/0249392 A1 Aug. 15, 2019

Related U.S. Application Data

(60) Provisional application No. 62/630,589, filed on Feb. 14, 2018.

(51) Int. Cl.
*A01D 17/06* (2006.01)
*A23N 12/00* (2006.01)
(Continued)

(52) U.S. Cl.
CPC .......... *A23N 12/005* (2013.01); *A01D 17/06* (2013.01); *B07B 1/14* (2013.01); *B07B 1/15* (2013.01); *B08B 1/02* (2013.01); *B08B 1/04* (2013.01); *B65B 5/045* (2013.01); *B65B 25/04* (2013.01); *E02F 5/06* (2013.01); *E02F 5/08* (2013.01);
(Continued)

(58) Field of Classification Search
CPC .. B07B 1/14; B07B 1/15; A01D 17/04; A01D 17/06; B65G 65/28; B65G 65/30; B65G 69/12; B65G 69/22; B65G 69/24; E02F 5/06; E02F 5/08; E02F 5/12;
(Continued)

(56) References Cited

U.S. PATENT DOCUMENTS 2,624,458 A * 1/1953 Molnau .................. A01D 17/06
209/667
2,997,086 A * 8/1961 Armer .................... A01D 17/06
99/636

(Continued)

FOREIGN PATENT DOCUMENTS

DE          10016042       10/2001
DE        202012009832     11/2012
(Continued)

*Primary Examiner* — Joseph C Rodriguez
(74) *Attorney, Agent, or Firm* — Mitchell Intellectual Property Law, PLLC

(57) ABSTRACT

A dirt removal and piling machine is ideally suited for use in cleaning and piling individualized and non-uniformly shaped workpieces, preferably sugar beets but also potatoes, other tuber crops, and even with aggregate rocks for a tilting receiving station. A further aspect of the present machine includes a workpiece unloading or receiving station which can tip sideways after a dump truck unloads the workpieces and longitudinally drives therethrough. In another aspect, the machine also includes a cleaning station having rotatable rollers, an underlying dirt conveyor and a moveable dirt dumping conveyor, hopper or bucket adjacent an end of the dirt conveyor and external to the rollers. Furthermore, another aspect of the machine includes an automatic and/or robotic sampling arm which is operable to remove a tuber crop workpiece sample and automatically package the sample after the sample has moved through a cleaning station.

5 Claims, 30 Drawing Sheets

(51) Int. Cl.
*B08B 1/02* (2006.01)
*B65B 5/04* (2006.01)
*B65B 25/04* (2006.01)
*B08B 1/04* (2006.01)
*B07B 1/14* (2006.01)
*B07B 1/15* (2006.01)
*E02F 5/06* (2006.01)
*E02F 5/08* (2006.01)
*E02F 5/12* (2006.01)
*E02F 5/24* (2006.01)
*E02F 5/30* (2006.01)
*B07B 15/00* (2006.01)
*B65G 69/12* (2006.01)
*B65G 41/00* (2006.01)

(52) U.S. Cl.
CPC ............... *E02F 5/12* (2013.01); *E02F 5/24* (2013.01); *E02F 5/30* (2013.01); *B07B 15/00* (2013.01); *B65G 41/00* (2013.01); *B65G 69/12* (2013.01)

(58) Field of Classification Search
CPC .... E02F 5/24; E02F 5/30; B65B 5/045; B65B 25/04; A23N 12/005; B08B 1/02; B08B 1/094
USPC .............. 198/550.01, 550.05, 443, 582, 531; 209/667, 673
See application file for complete search history.

(56) References Cited

U.S. PATENT DOCUMENTS

| | | | |
|---|---|---|---|
| 3,128,485 A | 4/1964 | Bradshaw | |
| 3,835,997 A * | 9/1974 | Hartmann | B65G 67/40 209/606 |
| 3,842,569 A | 10/1974 | McClelland et al. | |
| 4,164,052 A * | 8/1979 | Robache | A23N 12/005 15/3.11 |
| 4,303,506 A * | 12/1981 | Finlay | B07B 1/46 209/247 |
| 4,471,876 A * | 9/1984 | Stevenson, Jr | A01D 17/06 15/3.11 |
| 4,826,386 A * | 5/1989 | Corompt | B60P 1/165 298/17.7 |
| 5,577,618 A * | 11/1996 | Rafferty | B07B 1/005 209/244 |
| 5,975,441 A * | 11/1999 | Burkholder | B07B 1/155 241/101.76 |
| 6,085,890 A * | 7/2000 | Kelly | B65G 65/28 198/303 |
| 6,360,876 B1 * | 3/2002 | Nohl | B65G 41/008 198/302 |
| 6,543,622 B1 * | 4/2003 | Fridman | B07B 1/005 198/861.4 |
| 6,672,038 B2 | 1/2004 | McGrane et al. | |
| 6,820,733 B1 * | 11/2004 | Werner, Jr. | E01C 19/2045 198/457.01 |
| 7,083,375 B2 * | 8/2006 | Lewis | B61D 9/00 414/359 |
| 7,114,909 B2 * | 10/2006 | McCrory | B65G 67/42 414/809 |
| 7,284,650 B2 * | 10/2007 | Hoffmann | B65G 41/008 198/303 |
| 7,296,676 B2 * | 11/2007 | Smith | B65G 41/002 198/313 |
| 8,276,736 B2 * | 10/2012 | Steele | B65G 41/008 198/303 |
| 8,505,738 B2 * | 8/2013 | O'Keeffe | B07B 1/46 209/421 |
| 8,640,880 B2 * | 2/2014 | Farwick | B07B 1/155 209/671 |
| 9,498,797 B2 * | 11/2016 | Guenther | B03C 1/30 |
| 9,849,484 B2 * | 12/2017 | Guenther | B07B 1/145 |
| 10,537,918 B2 * | 1/2020 | Kringstad | B65G 65/28 |
| 2016/0057936 A1 | 3/2016 | Nilson | |
| 2019/0246682 A1 * | 8/2019 | Zuzga | B65B 25/04 |

FOREIGN PATENT DOCUMENTS

| | | |
|---|---|---|
| DE | 202013011409 | 2/2014 |
| EP | 0836799 | 4/1998 |

* cited by examiner

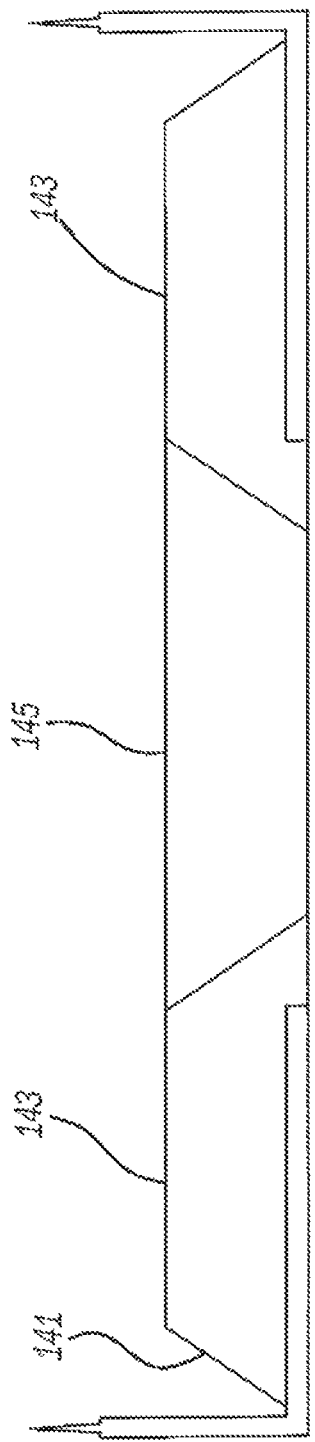
FIG-8A
FIG-8B

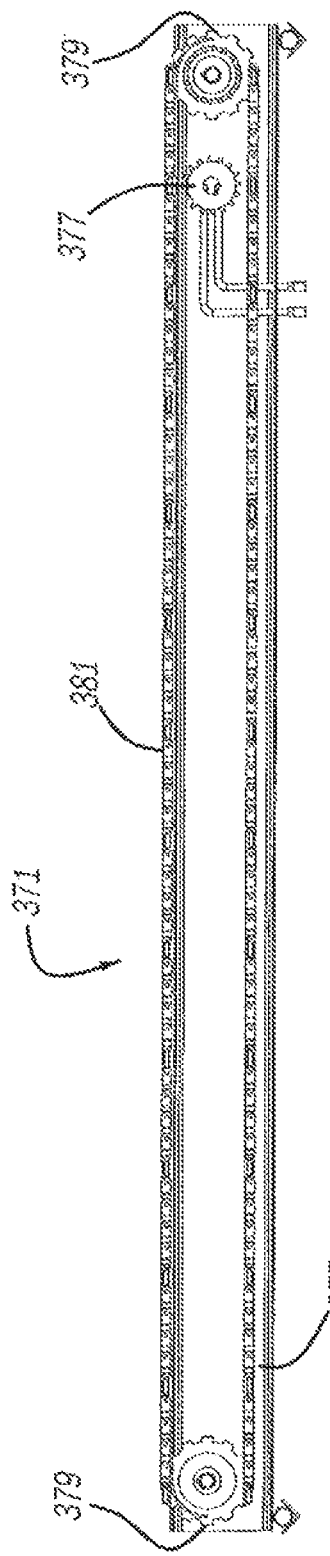
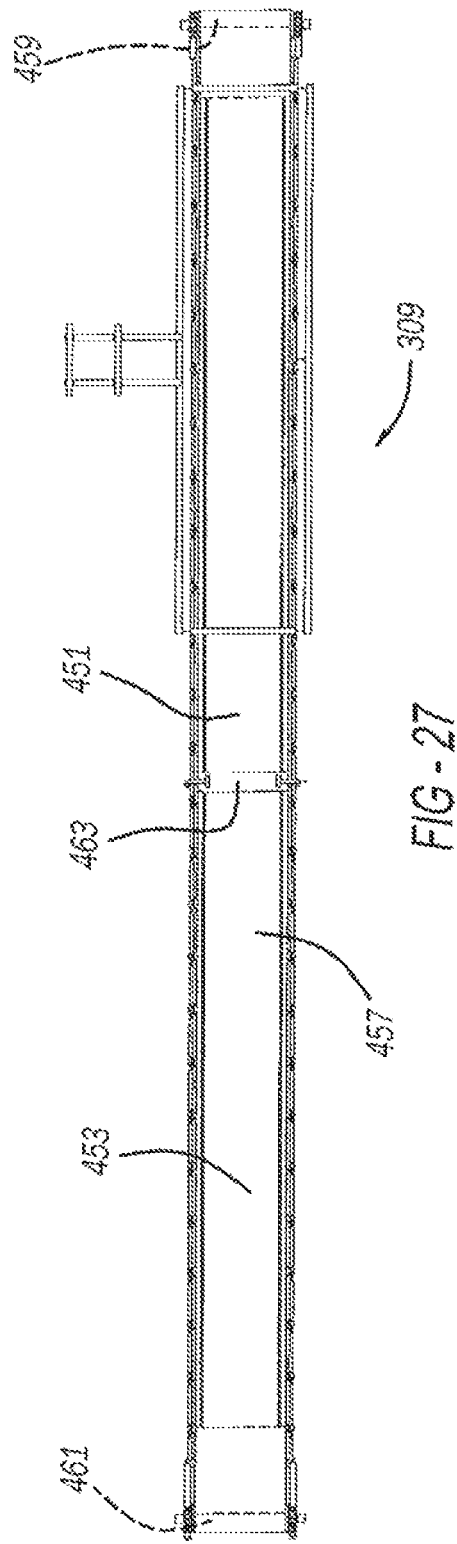

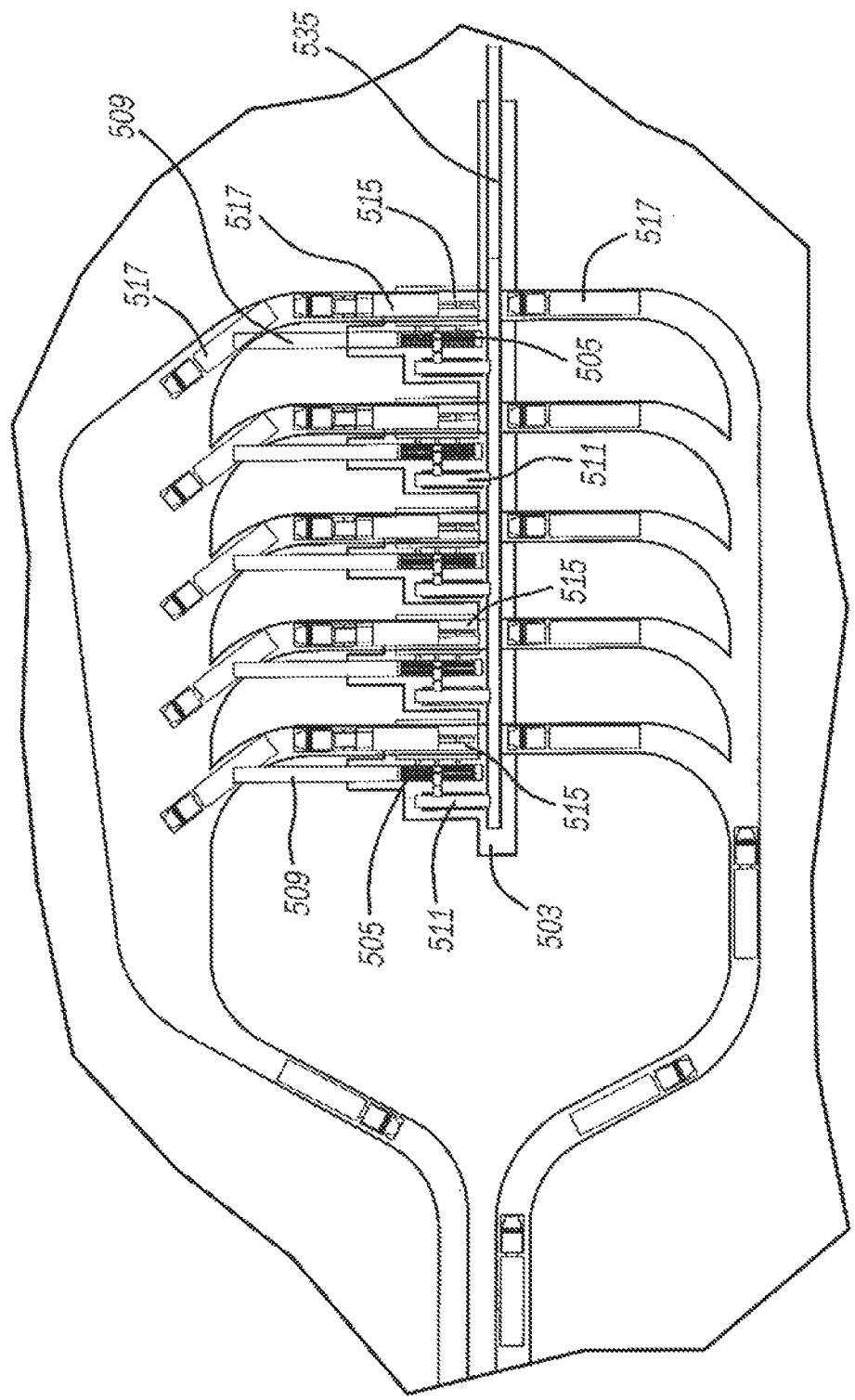

DIRT REMOVAL AND PILING MACHINE

CROSS-REFERENCE TO RELATED APPLICATIONS

This application claims the benefit of U.S. Provisional Application No. 62/630,589, filed on Feb. 14, 2018. The entire disclosure of the above application is incorporated by reference herein.

BACKGROUND AND SUMMARY

The present disclosure relates generally to a machine and more particularly to a dirt removal and piling machine for handling individualized and non-uniformly shaped workpieces.

It is known to provide very large, portable piling machines in the sugar beet industry. These conventional machines employ an unloading bin and conveyor for trucks to dump already harvested sugar beets upon, dirt removal rollers or screens, a dirt transporting conveyor belt, and a high-speed and narrow conveyor to discharge the cleaned beets to a beet pile on the ground. Another traditional piler uses a large dirt discharge container located directly below the cleaning rollers but without a conveyor belt therebetween; this discharge container approach is disadvantageously time consuming since the dump truck must await the slow movement of the discharge container from below the cleaning rollers, which also interrupts the cleaning operation. These prior machines damage the sugar beets, making the beets susceptible to infection, rot and a reduction in their sugar content. Furthermore, these slow conventional devices significantly delay the trucks between offloading the beets and receiving the discharged dirt, and also are prone to creating spills due to inaccurate or overflow offloading of the beets or discharged dirt.

In accordance with the present invention, a dirt removal and piling machine is provided. In another aspect, a dirt removal and piling machine is ideally suited for use in cleaning and piling individualized and non-uniformly shaped workpieces, preferably sugar beets but also potatoes, other tuber crops, and even with aggregate rocks for a tilting receiving station. A further aspect of the present machine includes a workpiece unloading or receiving station which can tip sideways after a dump truck unloads the workpieces and longitudinally drives therethrough. In another aspect, the machine also includes a cleaning station having rotatable rollers, an underlying dirt conveyor and a moveable dirt dumping conveyor, hopper or bucket adjacent an end of the dirt conveyor and external to the rollers. Furthermore, another aspect of the machine includes an automatic and/or robotic sampling arm which is operable to remove a tuber crop workpiece sample and automatically package the sample after the sample has moved through a cleaning station. In another aspect of the present machine, at least an upwardly angled main conveyor, and a telescopic and/or rotating piling conveyor are used after a cleaning station to discharge cleaned workpieces and pile the workpieces in a desired pattern. A method of using a dirt removal and piling machine is also disclosed.

The present dirt removal and piling machine is advantageous over conventional devices. For example, the present machine is manufactured and assembled in a modularized manner which allows for easy disassembly and placement of the modules on flatbed trucks for removal to another jobsite and/or for enclosed shop maintenance. Furthermore, the present machine is advantageous by capturing any spilled workpieces or dirt, and by minimizing such spillage. Moreover, the present machine advantageously imparts significantly less damage and bruising to the workpieces which is especially beneficial for tuberous crops such as sugar beets and potatoes. As another example, the on-site, automated sampling and bagging station of the present machine is more accurate, faster and less labor intensive than prior sampling techniques. The present machine also reduces truck waiting time and increases workpiece processing rates. Additional advantages and features of the present machine and method will become apparent from the following description and appended claims, taken in conjunction with the accompanying drawings.

BRIEF DESCRIPTION OF THE DRAWINGS

FIGS. 8A and 8B are diagrammatic views showing different pile configurations using the machine;

FIG. 26 is an end elevational view showing the conveyor of FIG. 25, employed in the conveyor table assembly of the second embodiment machine;

FIG. 27 is a top elevational view showing a dirt removal station of the second embodiment machine;

FIG. 31 is a top elevational view showing a variation of the third embodiment of the dirt removal and piling machine.

DETAILED DESCRIPTION

Figure 1:
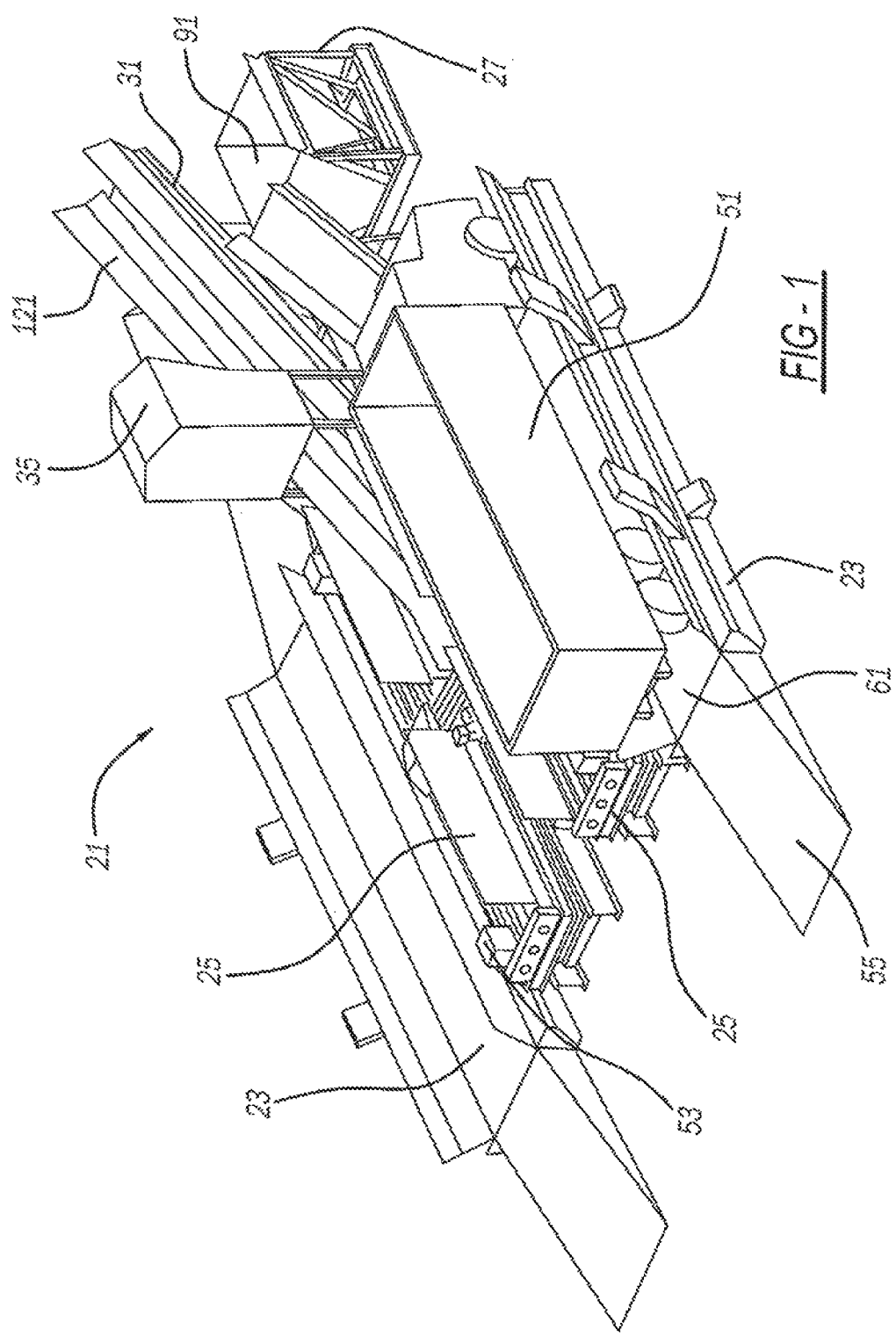
FIG. 1 is a perspective view showing a first embodiment of a dirt removal and piling machine.
Figure 2:
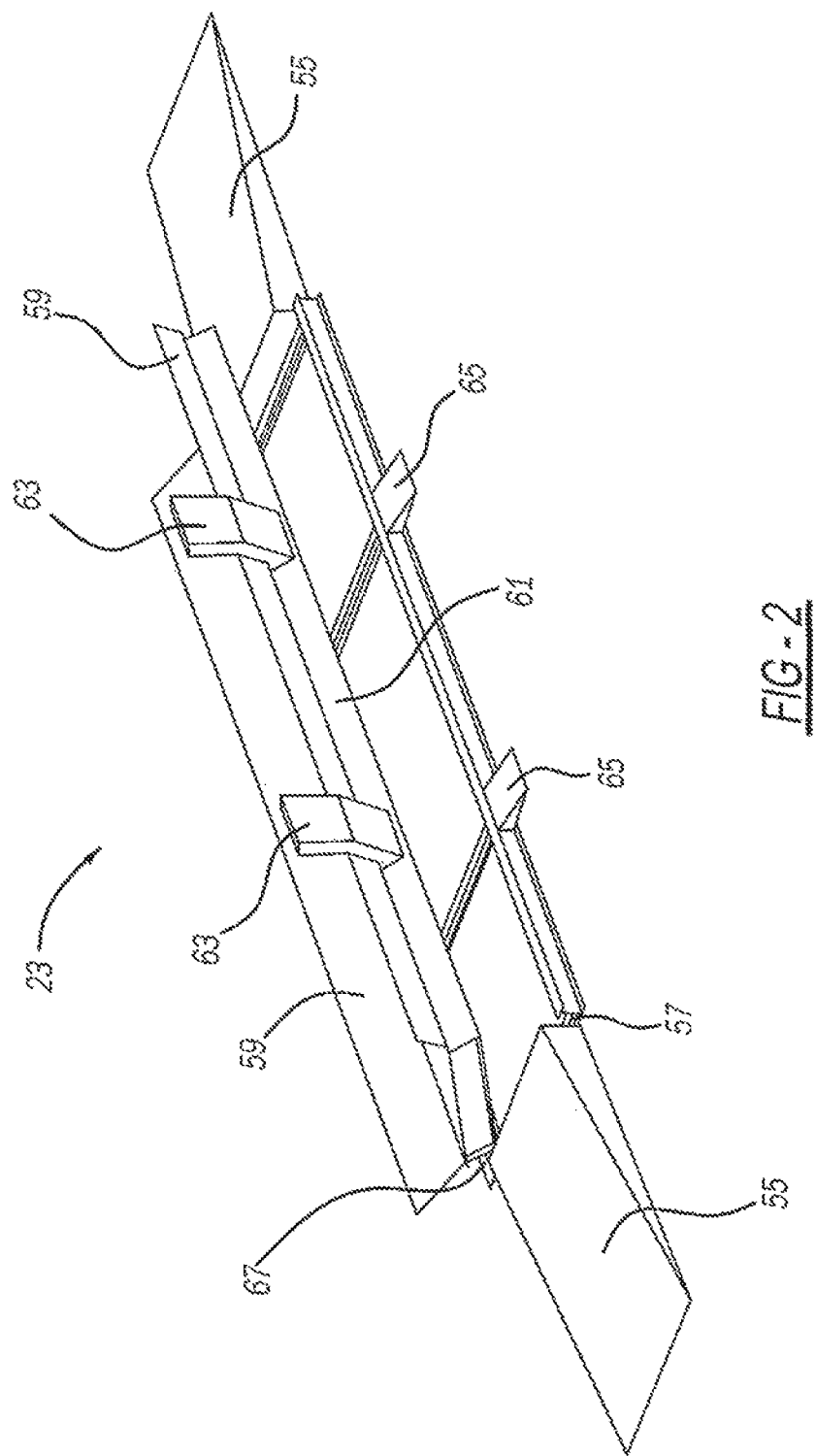
FIG. 2 is a perspective view showing a beet unloading station of the machine, in a sideways tipped orientation.
Figure 3:
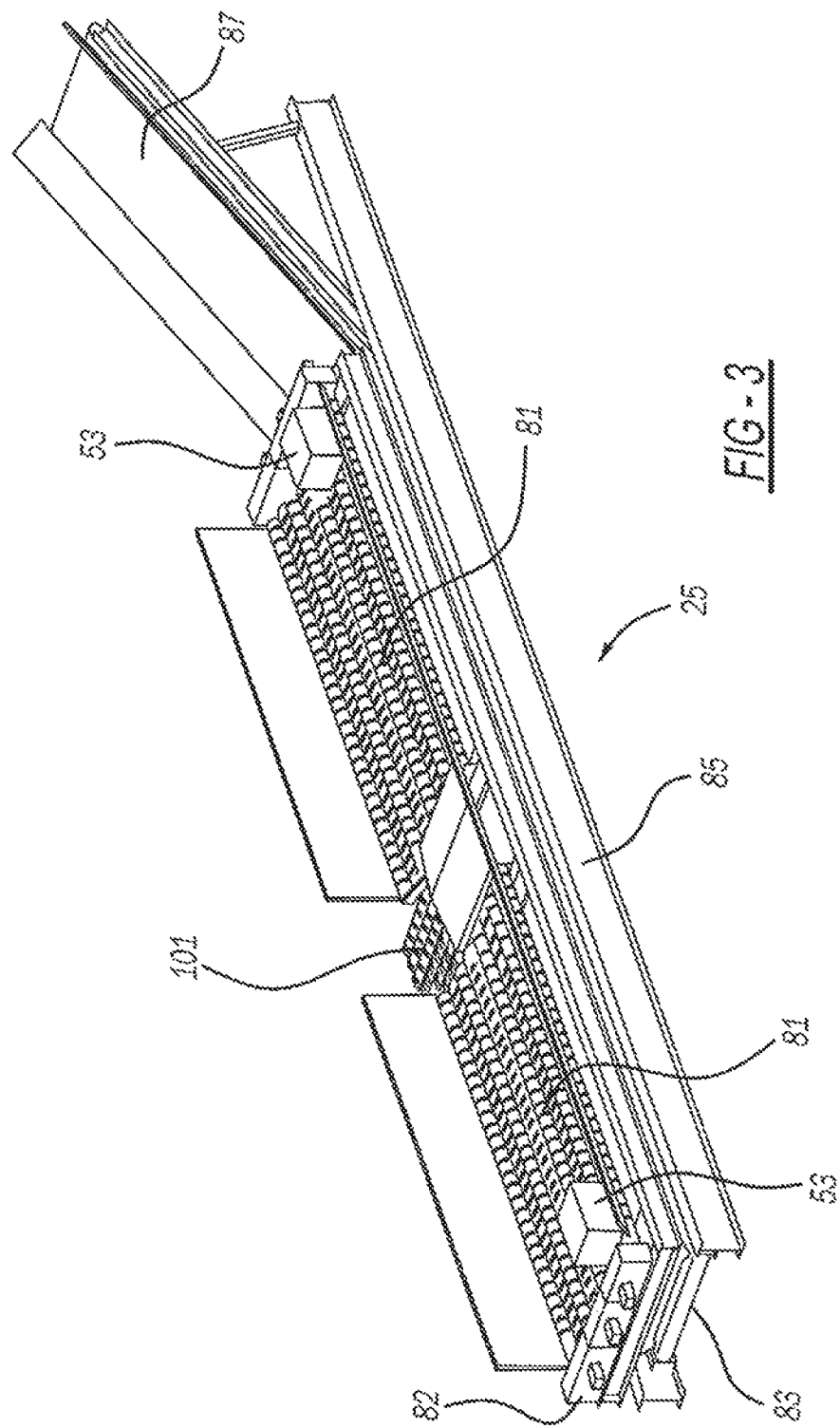
FIG. 3 is a perspective view showing a cleaning station of the machine.
Figure 4:
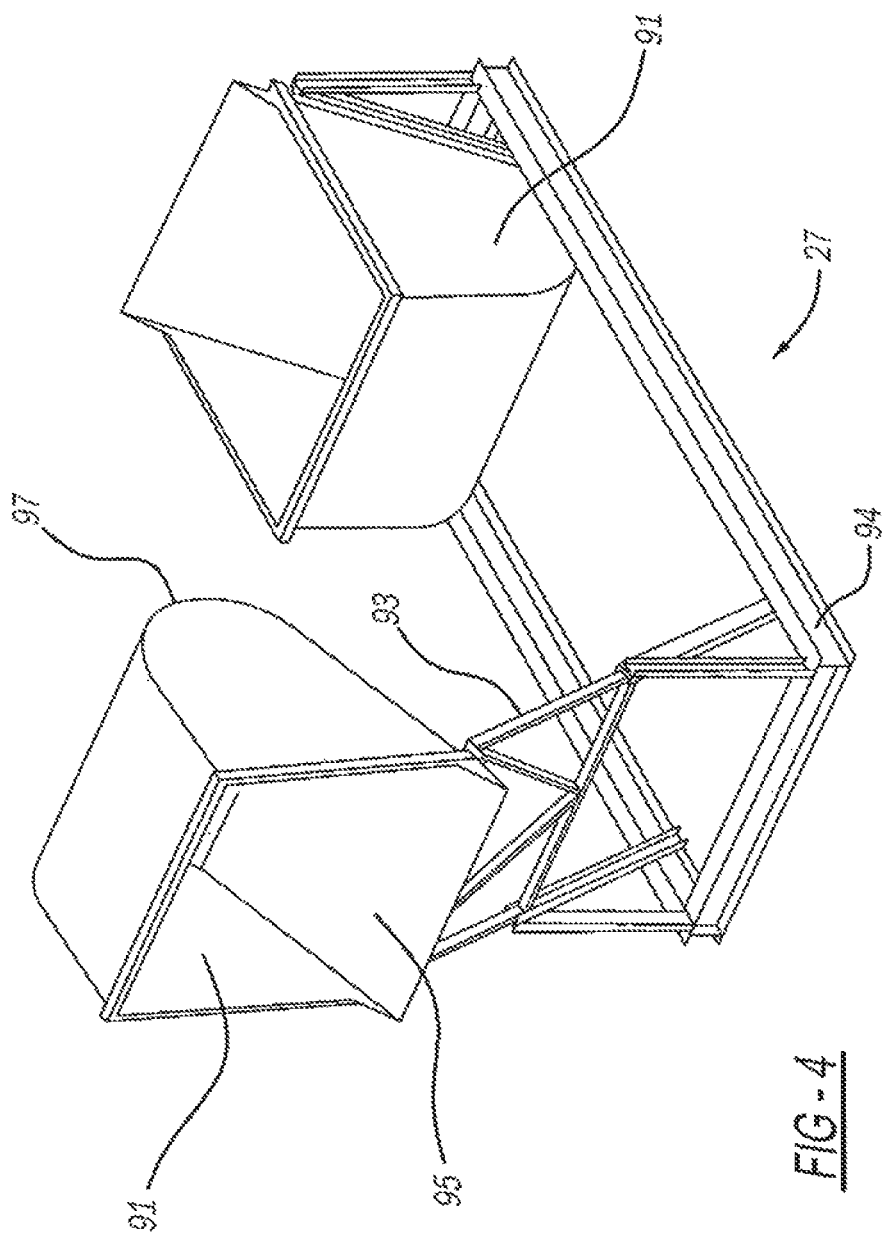
FIG. 4 is a perspective view showing a dirt removal station of the machine, with one hopper in a raised and dumping orientation, and with the other hopper in a nominal use orientation.
Figure 5:
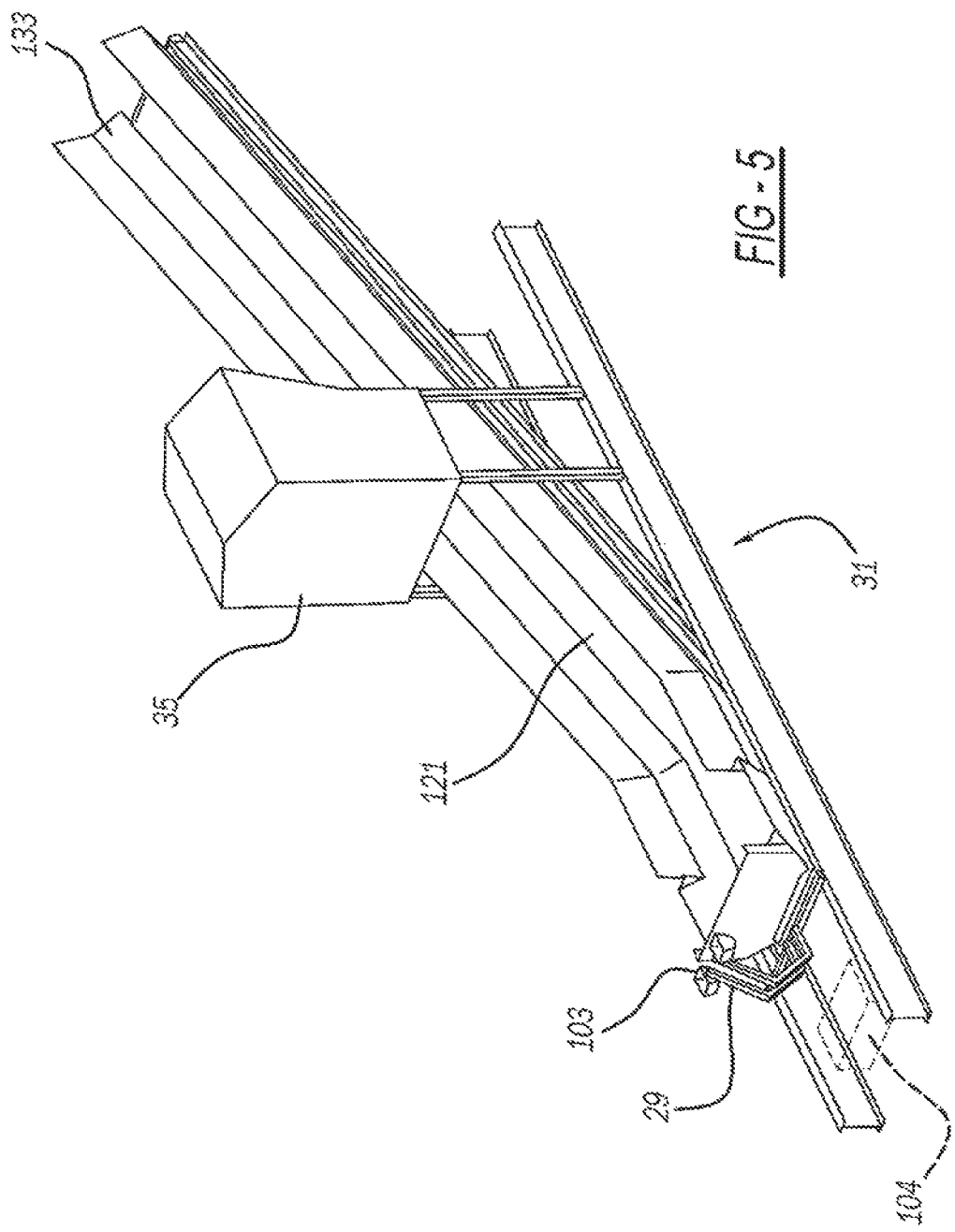
FIG. 5 is a perspective view showing sampling and main conveyor stations of the machine.
Figure 6:
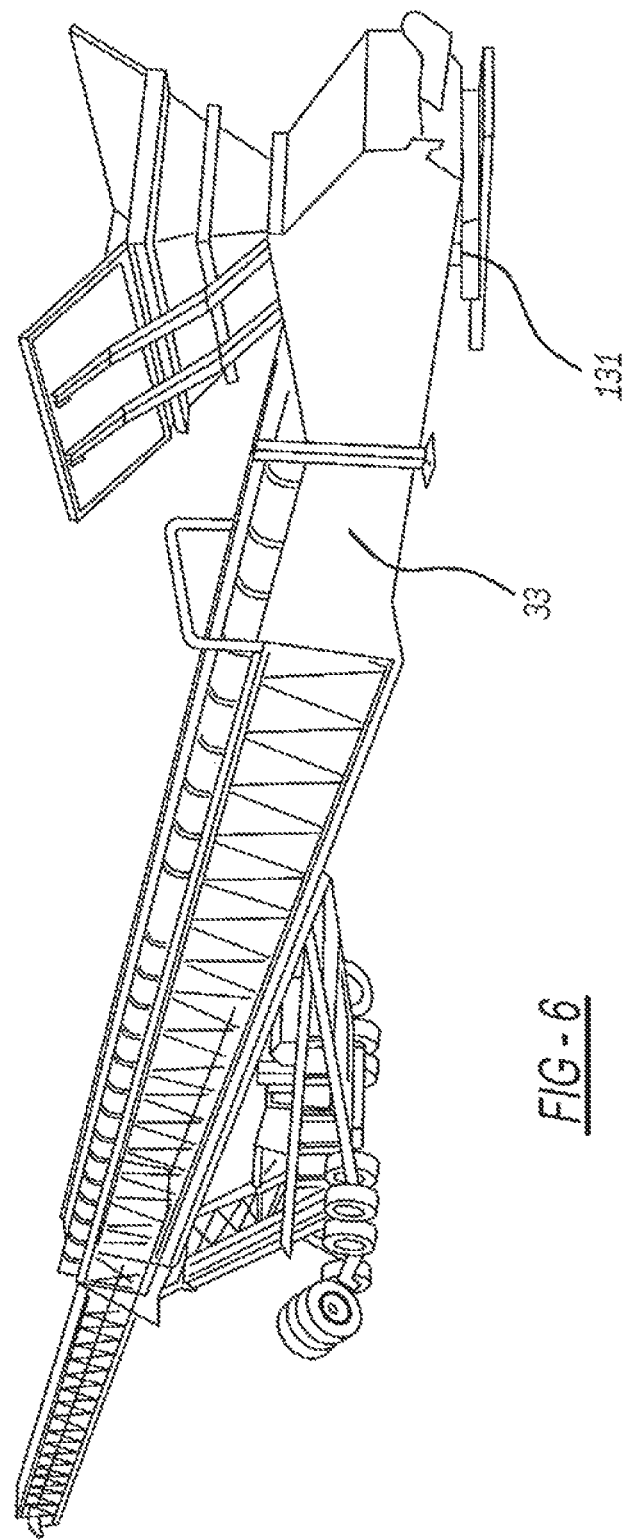
FIG. 6 is a perspective view showing a piling conveyor of the machine.

Referring to FIGS. 1-7, a first embodiment of a dirt removal and workpiece piling machine 21 includes a pair of sugar beet receiving and offloading stations 23, a pair of cleaning stations 25, a dirt dumping station 27, a sampling station 29, a central and main conveyor station 31, a piling conveyor 33 and a control room 35. A class 8 semi-truck or other such dump truck 51 includes an open-topped trailer which contains individualized and nonuniformly shaped workpieces, such as sugar beets 53. Truck 51 is longitudinally driven onto a bed of unloading station 23. When bed 61 is in its nominal horizontal position and a rearward ramp 55 is raised, the truck upwardly pivots its trailer about a lateral rear axis to dump out its load of beets through a rear opening gate as the truck longitudinally drives forward and off of the forwardmost ramp 55. Thereafter, both ramps 55 are upwardly rotated about horizontal pivot axes 57 (which may alternately be in the center of the ramp so only ends of the ramp are raised) by a hydraulic cylinder associated with each ramp 55.

Longitudinally elongated side walls 59 and upwardly rotated ramps 55 serve to enclose bed 61 of the associated offloading station 23. For each station 23, multiple hydraulic cylinders, spanning between brackets 63 and 65 operably tilt bed 61 about a longitudinally oriented axis 67 adjacent an inboard edge from the nominal position shown in FIG. 1 to the tilting position in FIG. 2. The titled rotation is preferably between 45-60°, inclusive, relative to the nominal horizontal position, and allows for inboard side dumping of the beets located therein.

Each bed may optionally include a scale to weigh the dumped beets. The truck stops its forward movement off of bed 61 adjacent dirt removal station 27. Furthermore, a second truck can optionally unload its sugar beet contents simultaneously on the opposite offloading station 23.

The rotation of bed 61 dumps the sugar beets therein onto outboardmost grab rollers 81 of cleaning station 25. The cleaning or screening station includes multiple longitudinally elongated and parallel rollers 81 which each have a spiral thread or raised formation on an exterior thereof continuously extending between its ends. Some of these rollers drive beets 53 in one longitudinal direction and when they near the end thereof, they laterally move to different sets of adjacent rollers which then push the beets in a reverse and opposite longitudinal directions and then back again with a third set of the rollers. There are spaces between each of rollers 81 which allow for dirt removal from beets 53 due to the tumbling action. The rollers are preferably hydraulically driven but may alternately be electromagnetically driven with chain and/or gear transmissions. The rollers and transmissions are coupled to a stationary frame 82.

An elongated dirt removal conveyor belt 83 longitudinally extends below all of rollers 81 in a first generally horizontal section 85 and then in an upwardly angled section 87. Conveyor 83 receives the workpiece dirt falling through the roller spaces. A distal end of angled section 87 of the dirt removal conveyor overhangs a hopper or bucket 91 of dirt removal station 27.

A hydraulic cylinder moves an associated hopper 91 from a lowered nominal position (as shown on the right side of FIG. 4), diagonally up a set of tracks 93 and subsequently rotated sideways to a tipping position about a horizontal axis (shown on the left side of FIG. 4) with an extended outer sidewall 95 with a lip projecting above a side of the lowered truck trailer to output dirt thereto. Hoppers 91 are moveably coupled to a stationary frame 94 via tracks 93. Each hopper 91 has a curved bottom 97, and sidewall 95 has a generally flat and diagonally angled shape to encourage complete dirt removal therefrom when tipped. It is noteworthy that the raising and rotating action of hopper 91 is a generally continuous motion due to a single advancing stroke of the hydraulic cylinder. Retraction of the cylinder reverses the hopper. Optionally, scales can be coupled to hoppers 91 to weigh the "tare" dirt therein before the dirt is dumped back into the truck. Each hopper 91 holds at least six tons of dirt and more preferably at least ten tons of dirt.

A laterally moving discharge conveyor belt 101 is centrally positioned in each cleaning station 25 and may be hydraulically raised and lowered by one or more hydraulic cylinders. Discharge conveyor 101 may be lifted to allow robotic arms 103 of automated sampling station 29 to capture a few sugar beets in a chamber therein as the beets move off of the cleaning station rollers 81. The sampling chamber is then automatically and robotically moved to align above a bagging machine 104 whereafter a bottom floor of the chamber is automatically opened and the sampled sugar beets therein fall into an opening in the bagging machine. The bagging machine automatically encloses the sampled beets into a bag, encloses the bag and labels the bag without requiring manual intervention.

After the sampling arms have removed the samples, the hydraulic mechanism will return discharge conveyor 101 to its nominal position. The discharge conveyor, in its nominal position, receives and removes the sugar beets falling from proximal ends of rollers 81 adjacent thereto, and drops beets laterally onto a central and upwardly angled conveyor belt 121 of main conveying station 31. This central belt 121 is preferably made of an elastomeric material which is driven by a series of electromagnetically (e.g., electric motor) actuated rollers in a continuously looped manner. Optionally, a chevron rubber-cleated pattern can be molded in a raised manner from the otherwise generally flat belt to better retain the beets. Moreover, belt 121 is preferably at least 70 inches in width and has a capacity of at least 1200 TPH.

One exemplary bagging machine is disclosed in U.S. Pat. No. 3,842,569 entitled "Carrot Bagging Apparatus and Method" which issued to McClelland et al. on Oct. 22, 1974, and is incorporated by reference herein. Another exemplary bagging machine can be found in U.S. Pat. No. 6,672,038 entitled "Bag Manipulating Method and Assembly for a Bag Filling Station" which issued to McGrane et al. on Jan. 6, 2004, and is incorporated by reference herein.

Piling conveyor 33 has a hitch 131 adjacent a proximal end thereof which mounts to a coupling bracket attached near an output end 133 of central conveyor 121. Piling conveyor 33 may rotate about a vertical axis aligned with hitch 131, and may longitudinally expand and retract in a telescoping and stacked manner toward and away from hitch 131. Conveyor 33 also preferably has a width of at least 70 inches. Piling conveyor 33 includes a belt and rollers, which overhang beyond the remainder of the machine.

Figure 7:
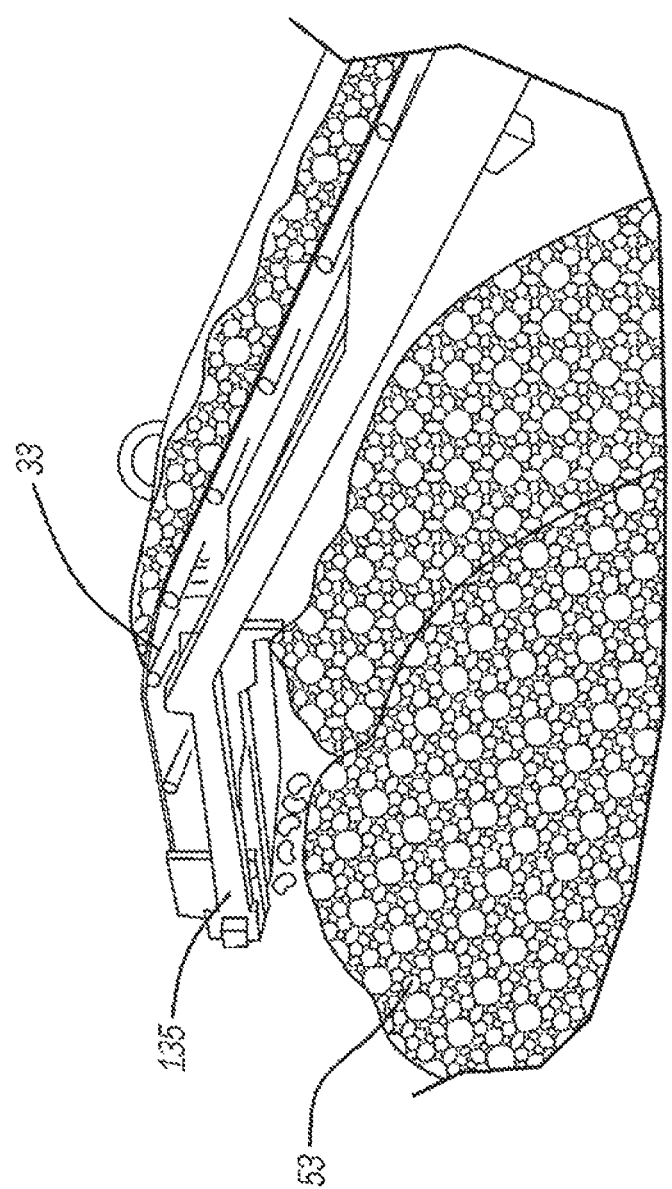
FIG. 7 is a fragmentary perspective view showing a distal end of the piling conveyor of the machine, acting to pile sugar beet workpieces.

Referring to FIG. 7 and FIG. 8A, sugar beets 53 fall off of a distal end 135 of piling conveyor 33 in piles that have generally flat forward, back and sidewall planes 141 for a pair of opposite outer sections 143. Outer sections 143 have a height of approximately 30 feet and a middle section 145 having a height of approximately 16-18 feet off of the ground; thus, the middle is lower than the outer sections. Traditional sugar beet piles each had spaced apart sections as illustrated in FIG. 8B, but without a middle pile section. However, the present machine advantageously piles the sugar beets in a continuous manner including between the outer conventional pile outer sections 143. This greatly increases the pile capacity of the storage lot and reduces rim-beet or rot which is otherwise susceptible at the exposed outer sidewalls of each spaced apart section. The movement capabilities of the present machine, and especially that of piling conveyor 33, allow for the presently improved piling configuration.

All modules and stations of machine 21 include wheels that contact the storage lot. A diesel motor actuator operably drives transmissions which, in turn, drive some of these wheels. This allows the entire machine to be moved across the storage lot.

Figure 9:
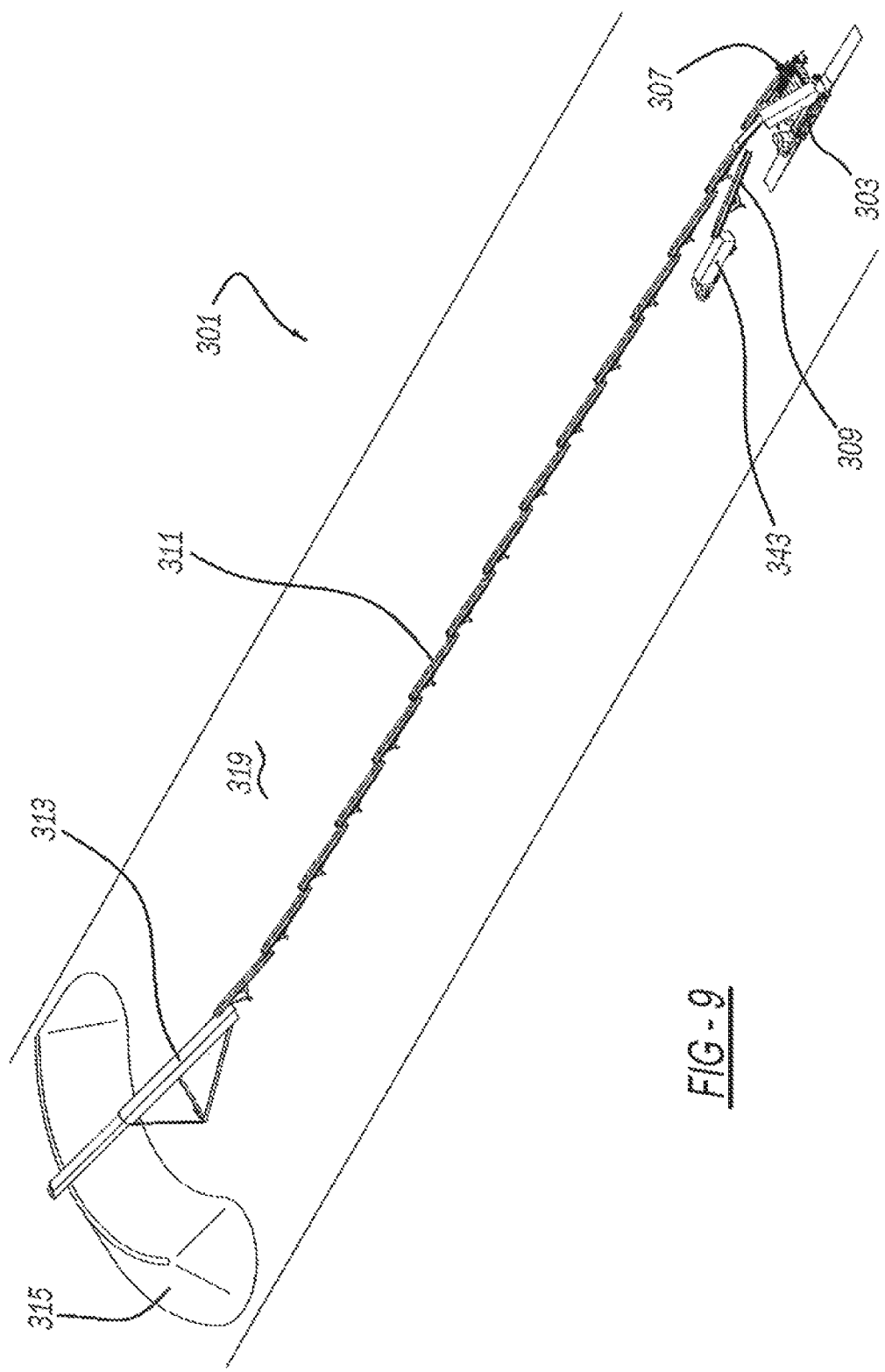
FIG. 9 is a perspective view showing a second embodiment of the dirt removal and piling machine.
Figure 10:
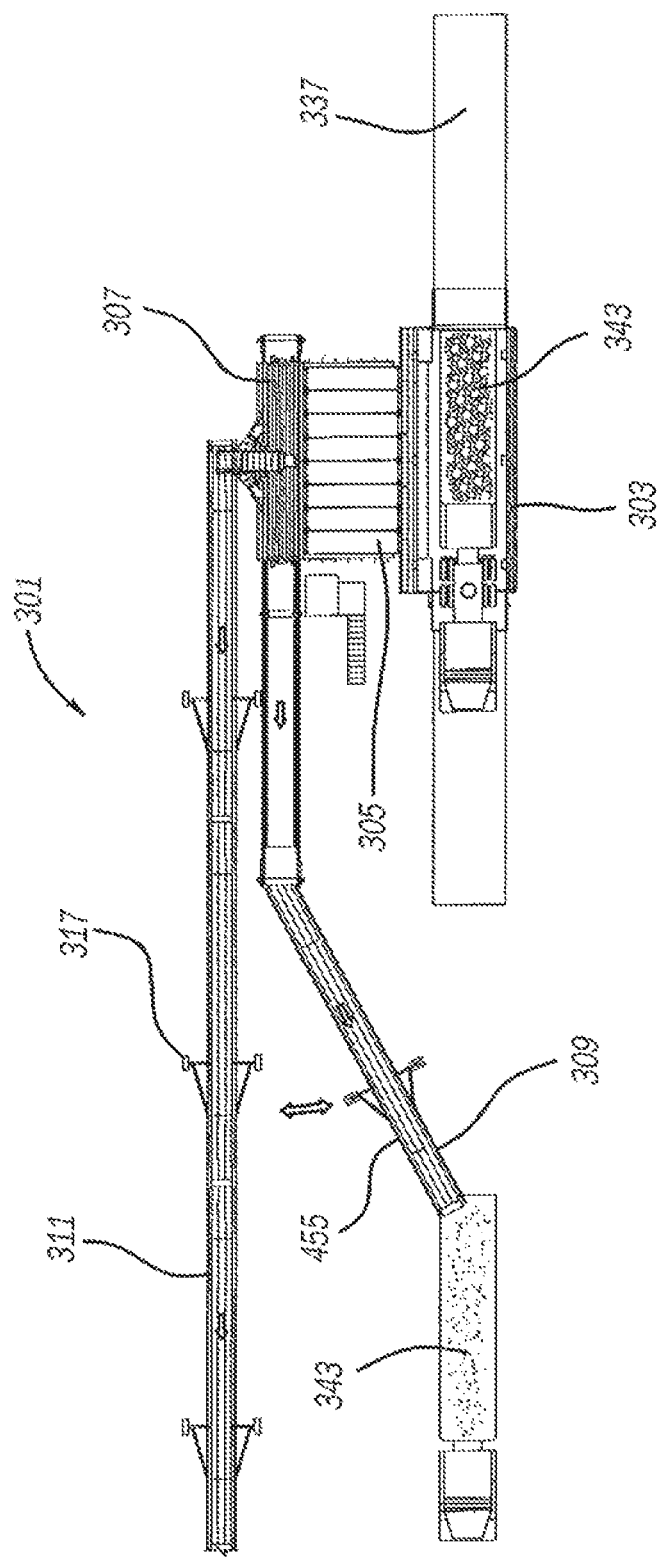
FIG. 10 is a top elevational view showing a beet unloading station and a cleaning station of the second embodiment machine.
Figure 11:
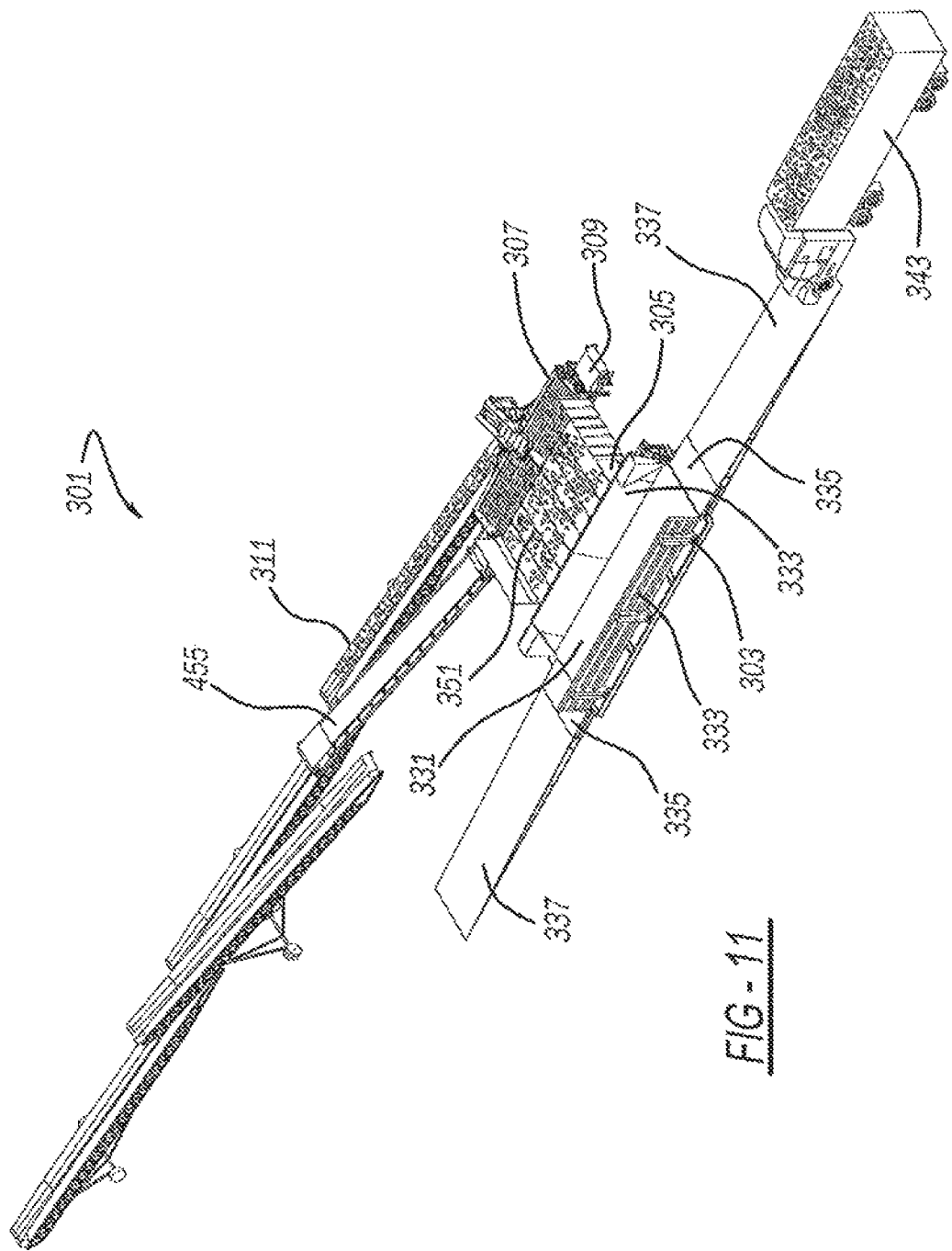
FIGS. 11-16 are a series of perspective views showing the beet unloading station and the cleaning station of the second embodiment machine.

A second embodiment of a dirt removal and piling machine 301 can be observed in FIGS. 9-11. Machine 301 includes a workpiece-receiving station 303, a feed conveyor table assembly 305, a cleaning station 307, a dirt removal and transporter 309, and a series of main piling conveyors 311. At least one, more preferably at least three, and in the illustrated example, sixteen main piling conveyors 311 are employed in an overlapping fashion with a distal piling conveyor 313 being telescopically extendable and taller than the preceding piling conveyors. Each of the piling conveyors are portable such that they may be removed from the serial chain as distal piling conveyor 313 unloads beets onto a beet pile 315 in an arcuate manner as it is wheeled about its vertical pivot axis adjacent its lower end. When an intermediate conveyor 311 is removed, distal conveyor is moved closer to cleaning station 307 so as to increase the on-ground pile size in a longitudinal direction toward the cleaning station. Each piling conveyor 311 has a set of wheels 317 which ride along the ground 319, with distal piling conveyor 313 having multi-directional sets of wheels to allow arcuate rotation and/or longitudinal movement as the beets are being offloaded therefrom.

Receiving station 303 can better be observed with reference to FIGS. 11, 16-18 and 19-21. Receiving station 303 includes a generally horizontally planar and flat bed 331, when in its nominal lowered orientation, bordered by opposite inboard and outboard sidewalls 333. Sidewalls 333 are primarily vertically extended at a slight diagonal angle which are wider toward the top open end. End doors 335, also serving as part of ramps 337, are each moveably coupled to a buttress corner 339 of inboard sidewall 333 by a hydraulically actuated cylinder 341. This allows each end door 335 to be rotated about a horizontal axis from its lowered position (see FIG. 11) to its upward and closed position (see FIGS. 13, 17 and 20) when a truck vehicle and associated wheeled trailer 343 have moved past the lowered door.

Figure 12:
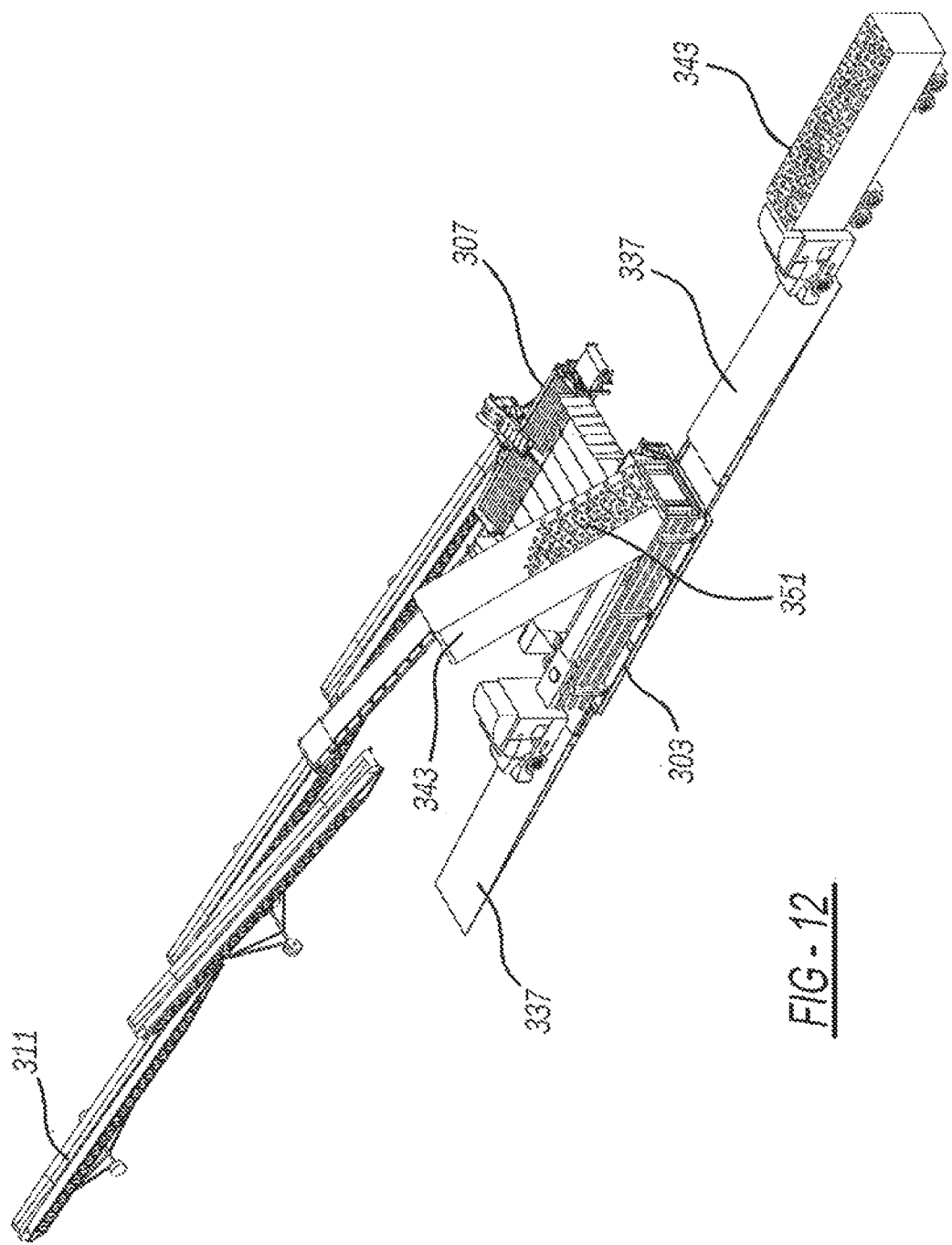
Figure 13:
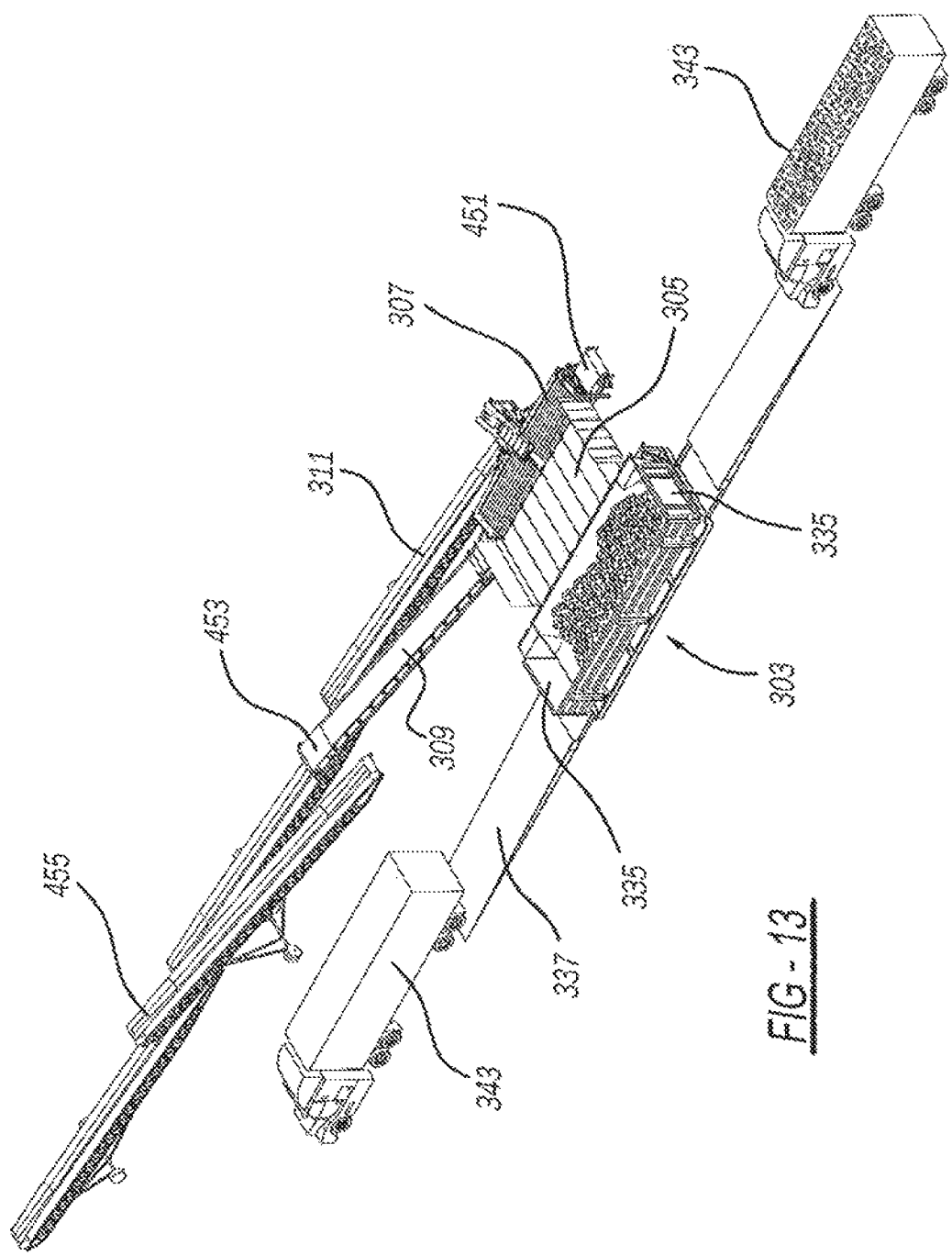
Figure 14:
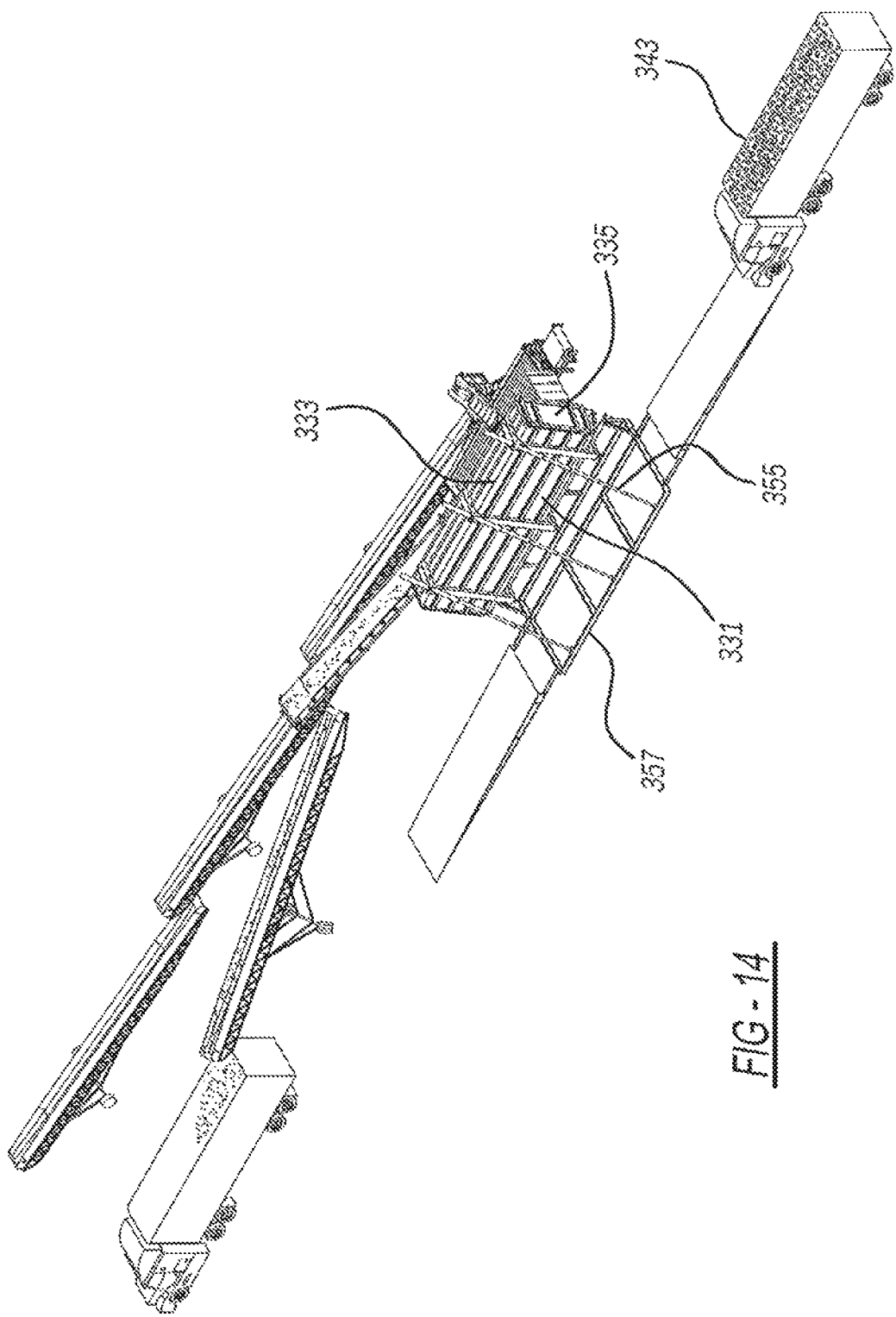
Figure 15:
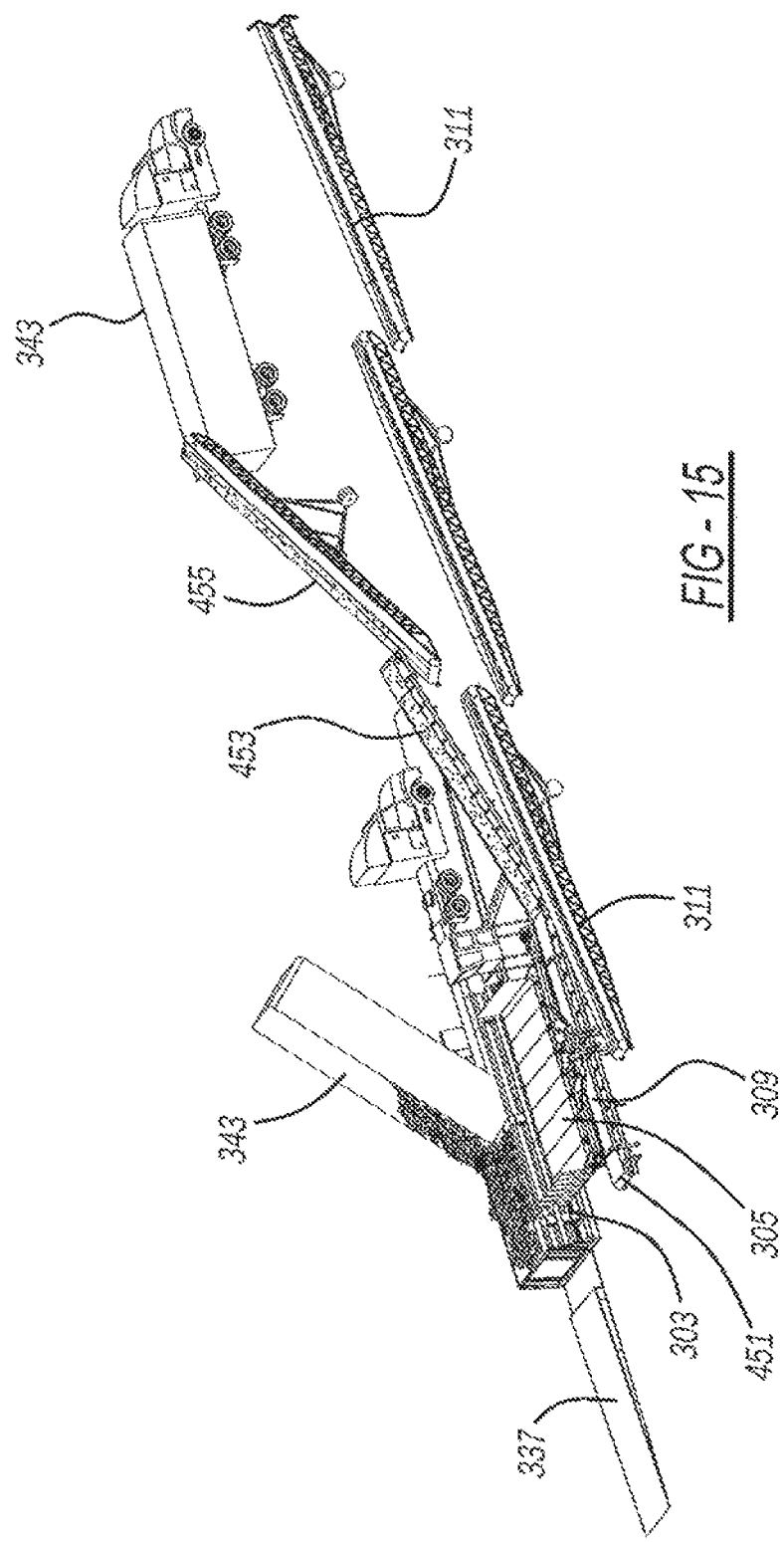
Figure 16:
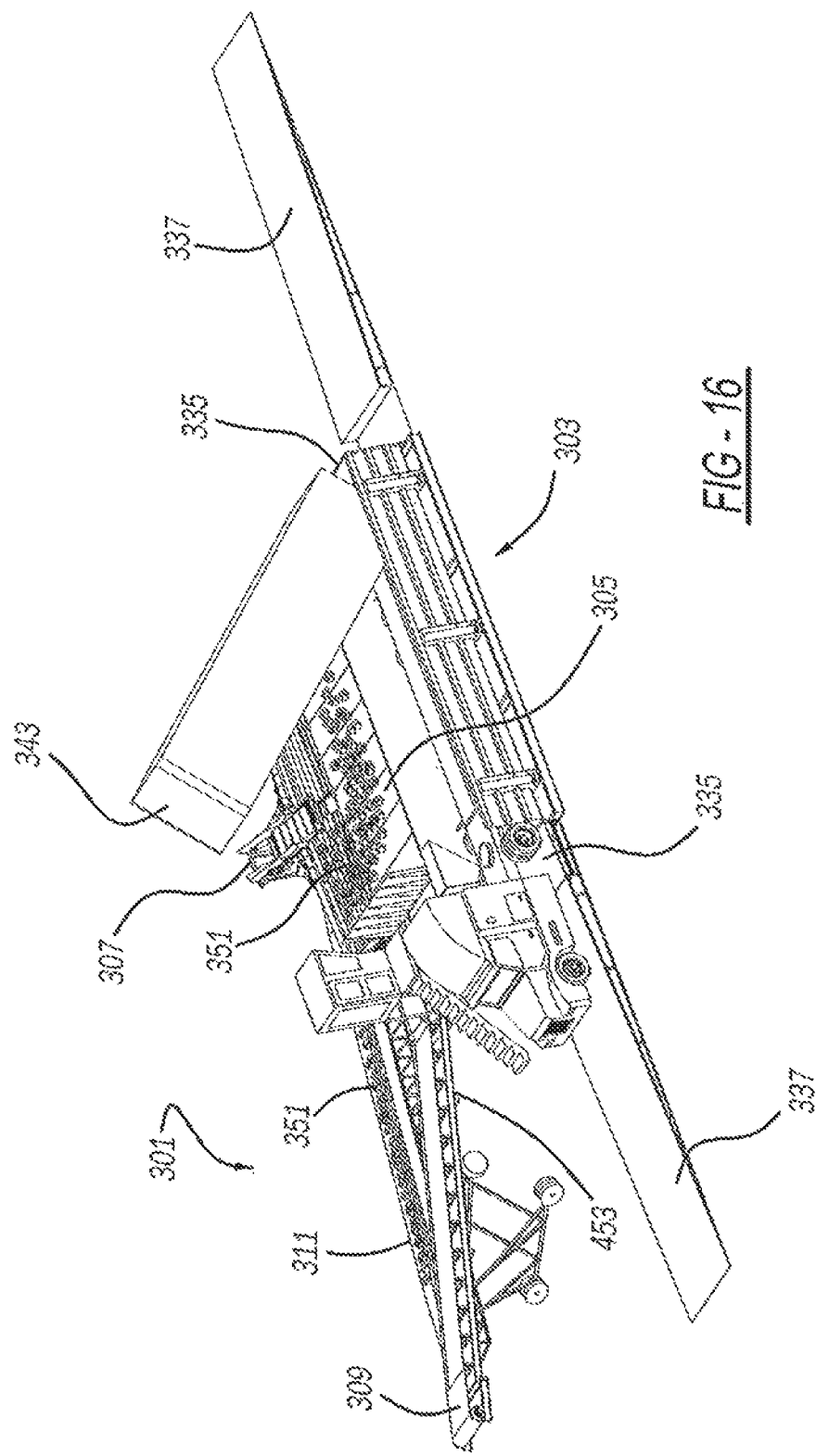
Figure 17:
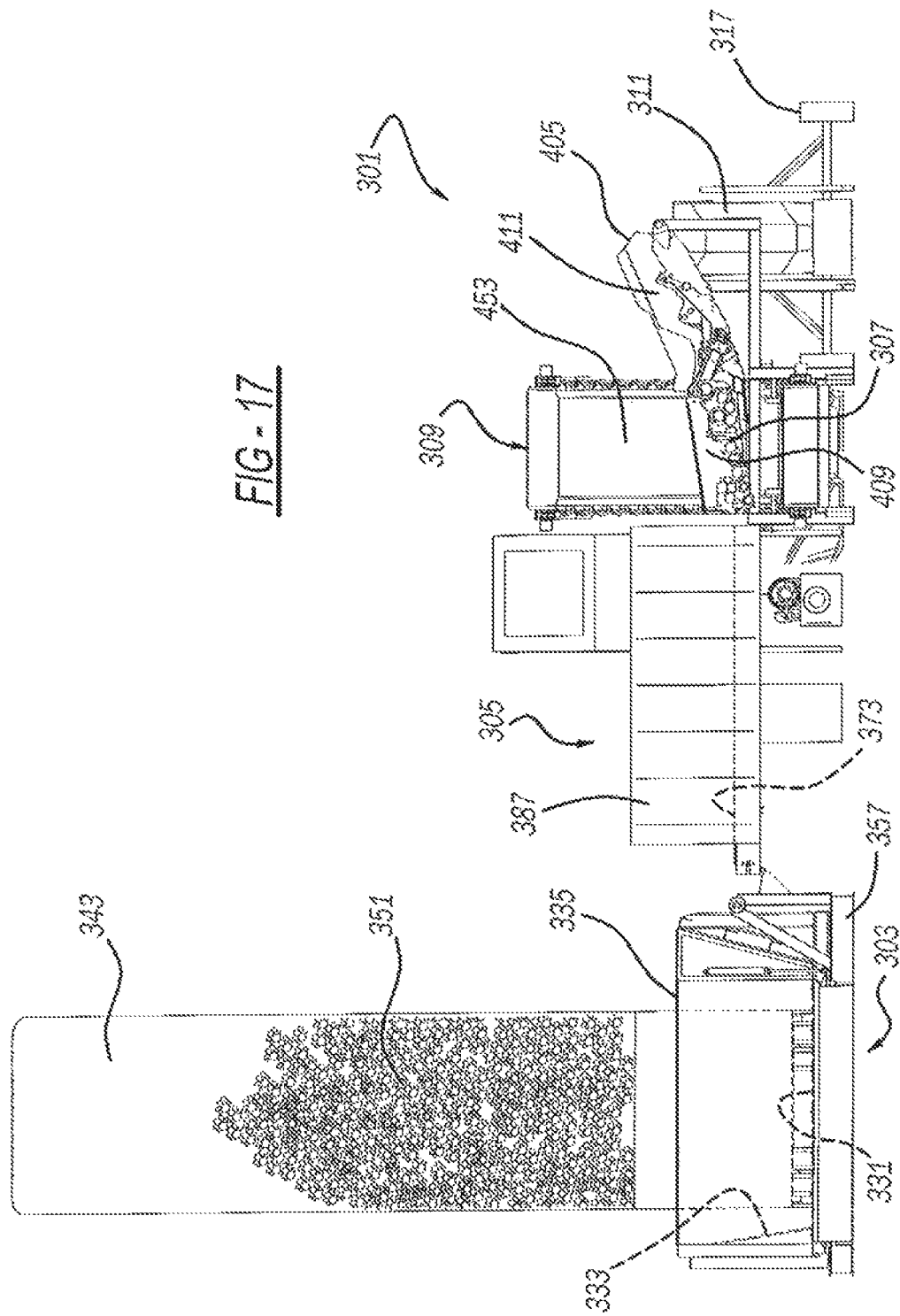
FIG. 17 is an end elevational view showing the second embodiment machine.
Figure 19:
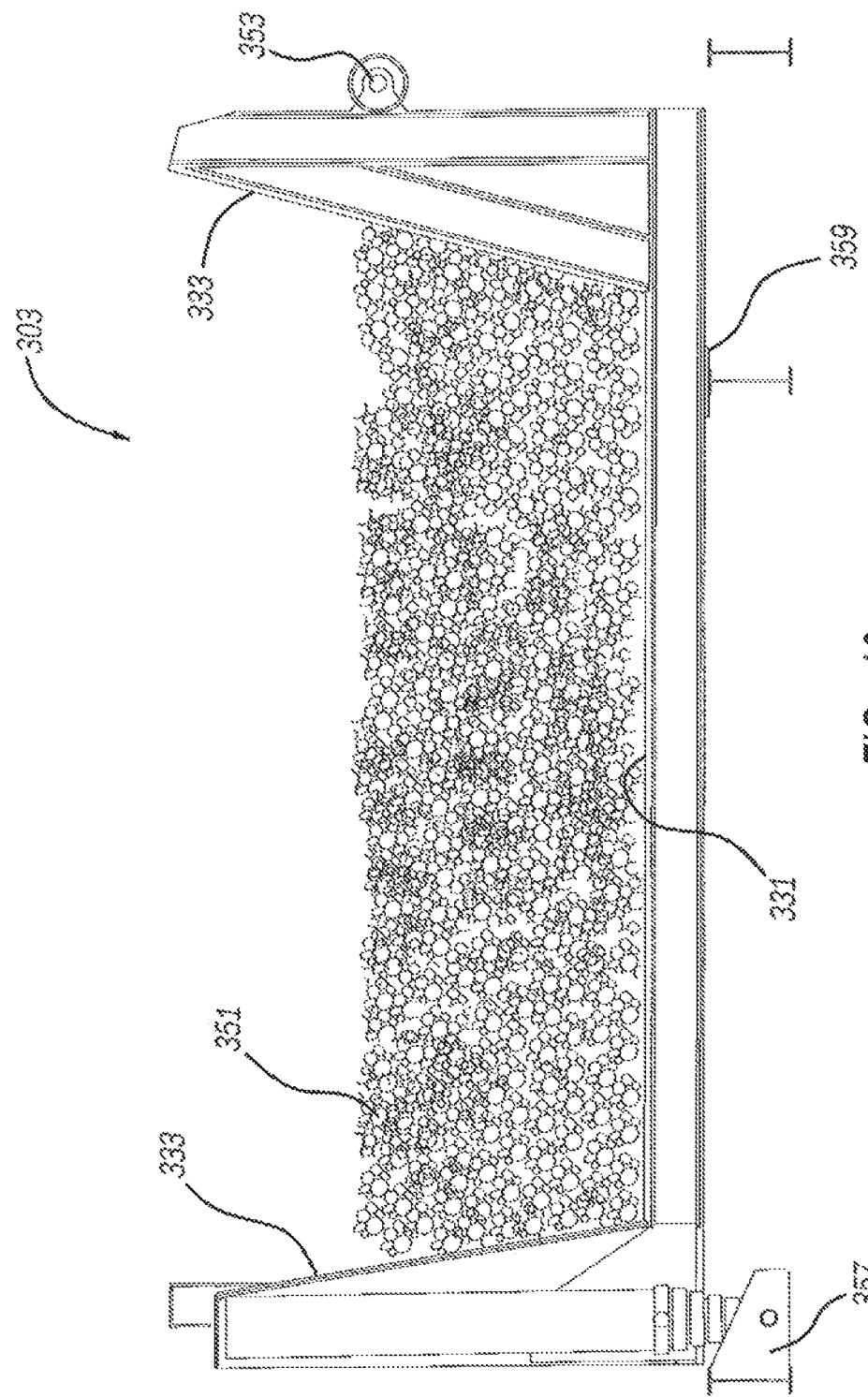
FIG. 19 is an end elevational view showing the beet unloading station of the second embodiment machine in a nominal lowered orientation.
Figure 20:
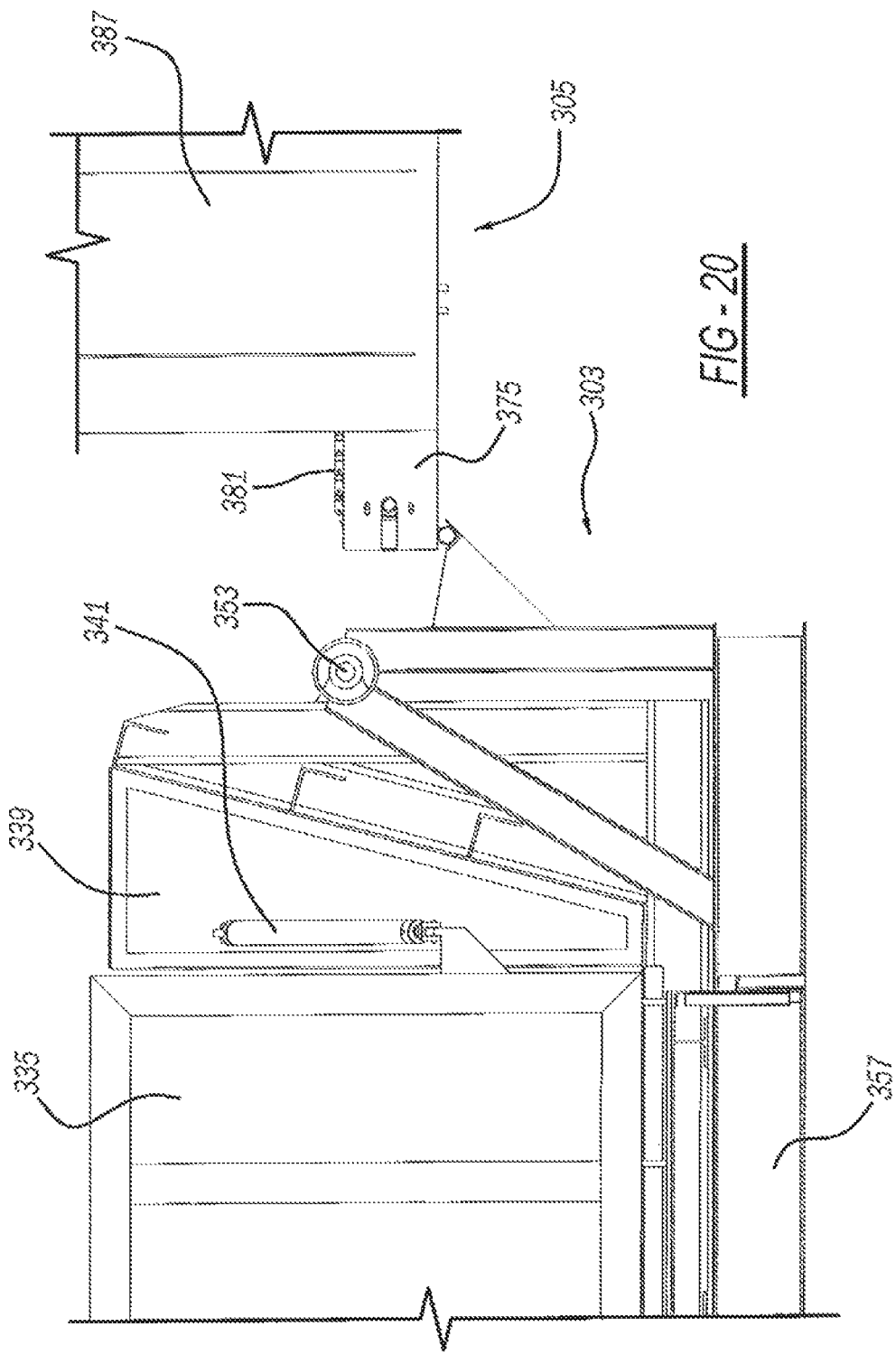
FIG. 20 is a fragmentary end elevational view showing the unloading station of the second embodiment machine, and the nominal lower orientation and with a ramp door in a raised position.
Figure 21:
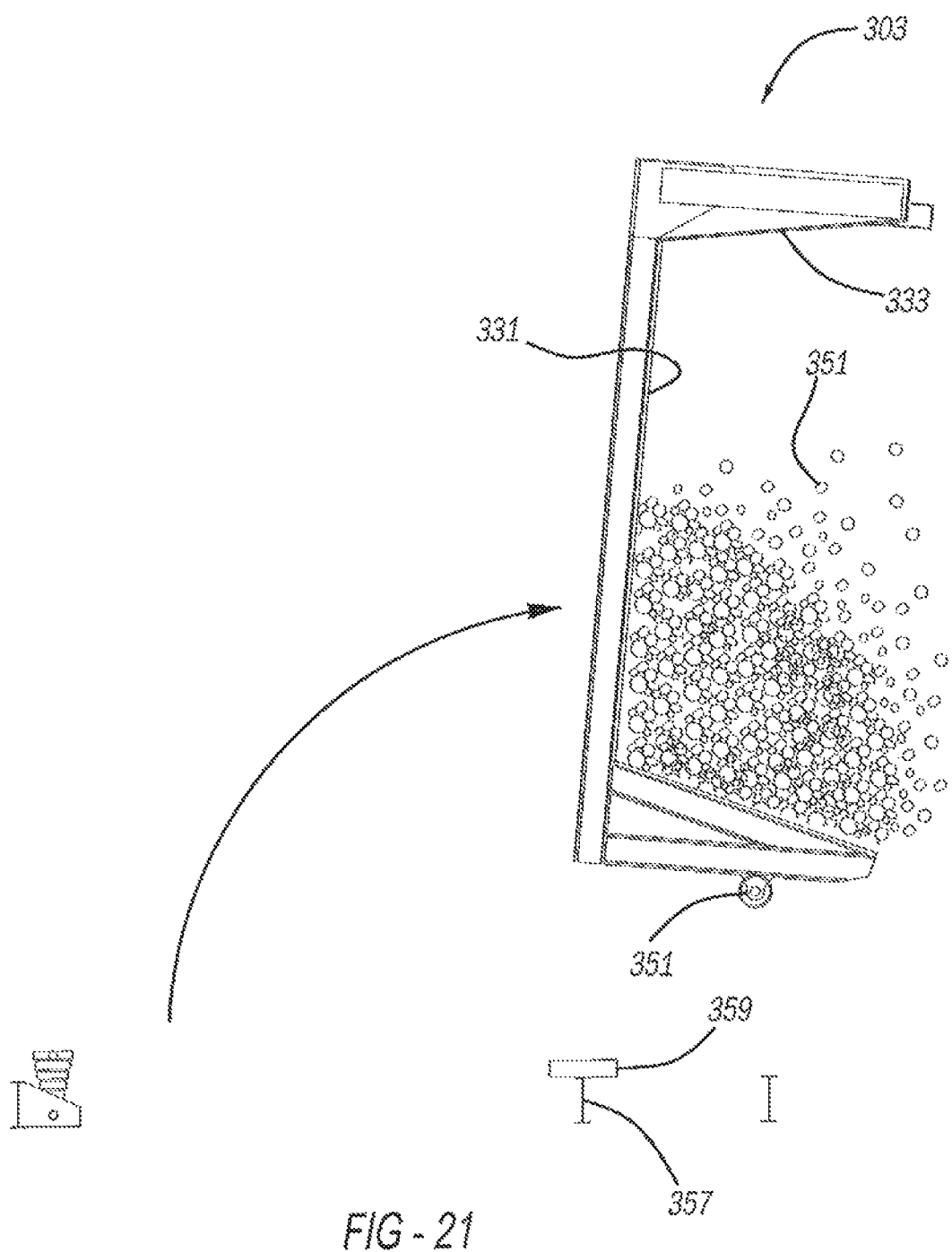
FIG. 21 is an end elevational view showing the unloading station of the second embodiment machine, in a sideways tipped orientation.
Figure 22:
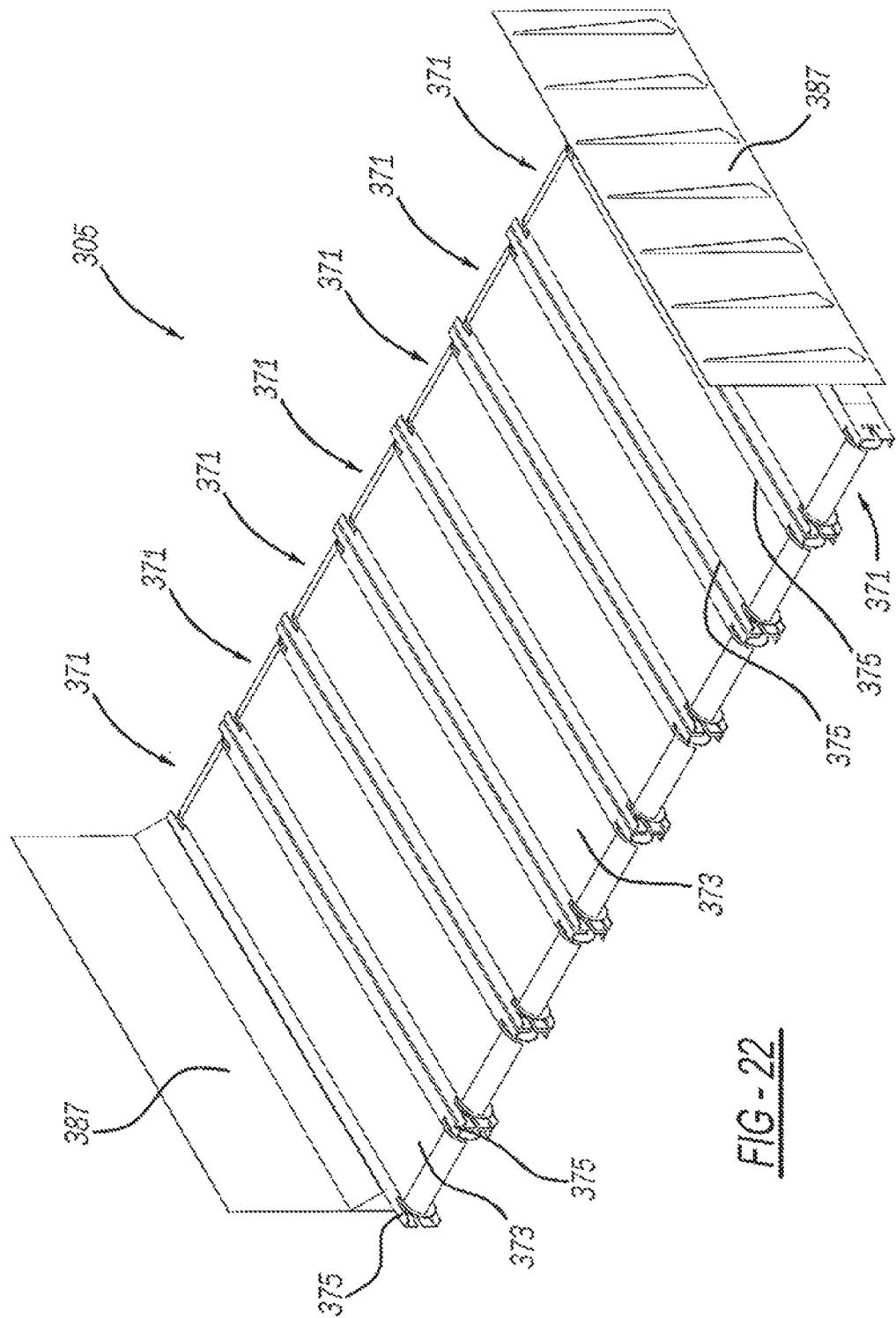
FIG. 22 is a perspective view showing a conveyor table assembly employed in the unloading station of the second embodiment machine.
Figure 23:
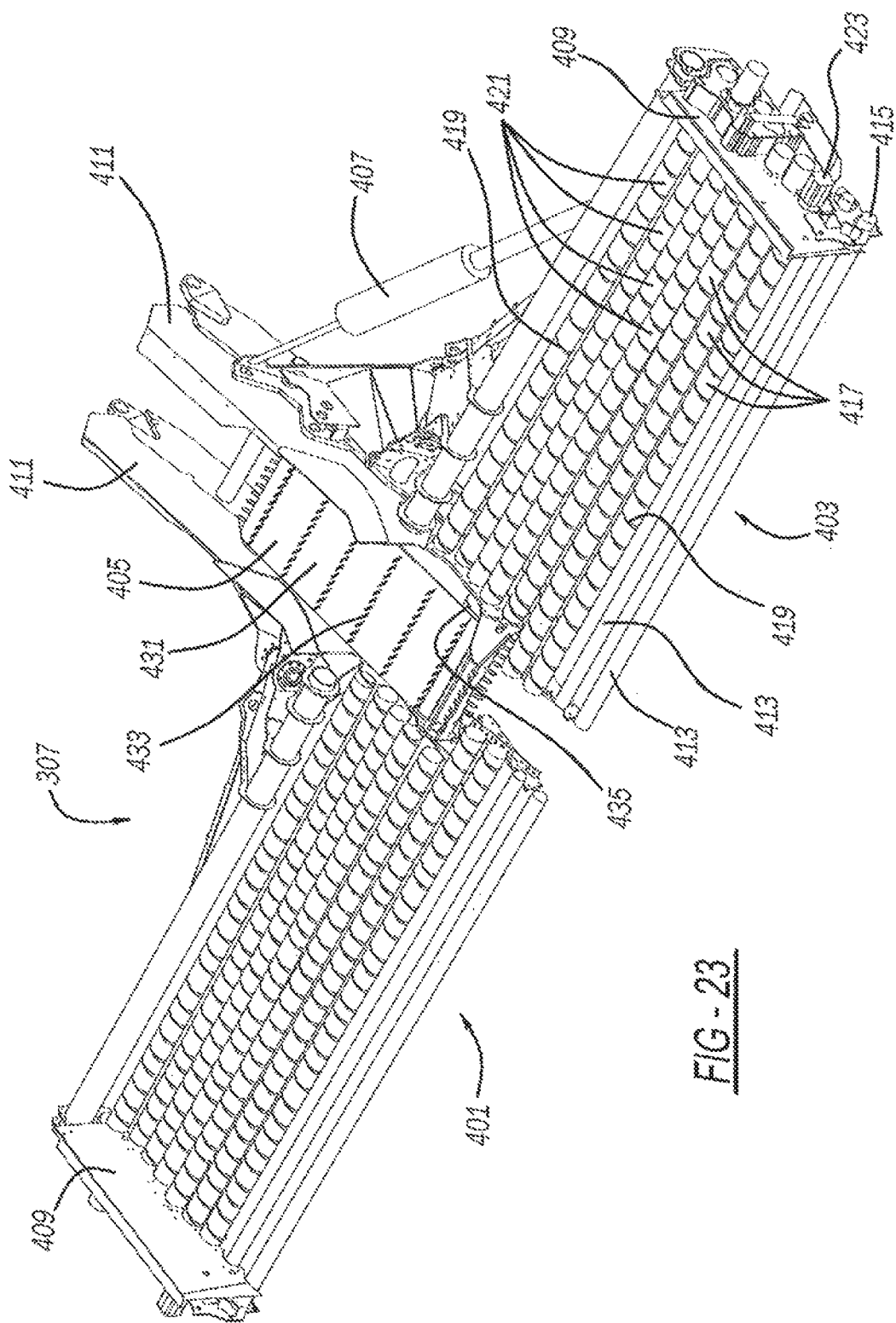
FIG. 23 is a perspective view showing the cleaning station of the second embodiment machine.
Figure 24:
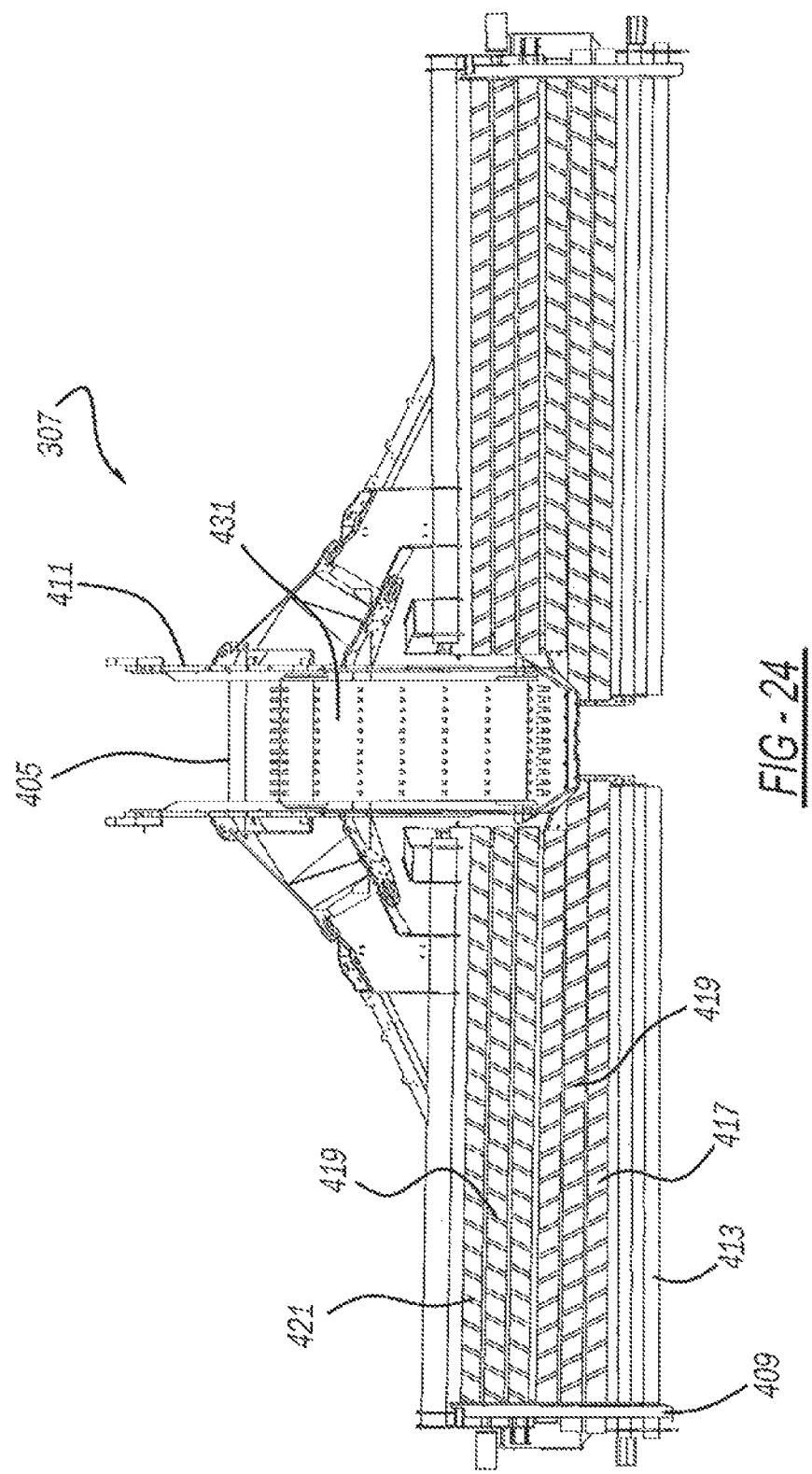
FIG. 24 is a side elevational view showing the cleaning station of the second embodiment machine.
Figure 25:
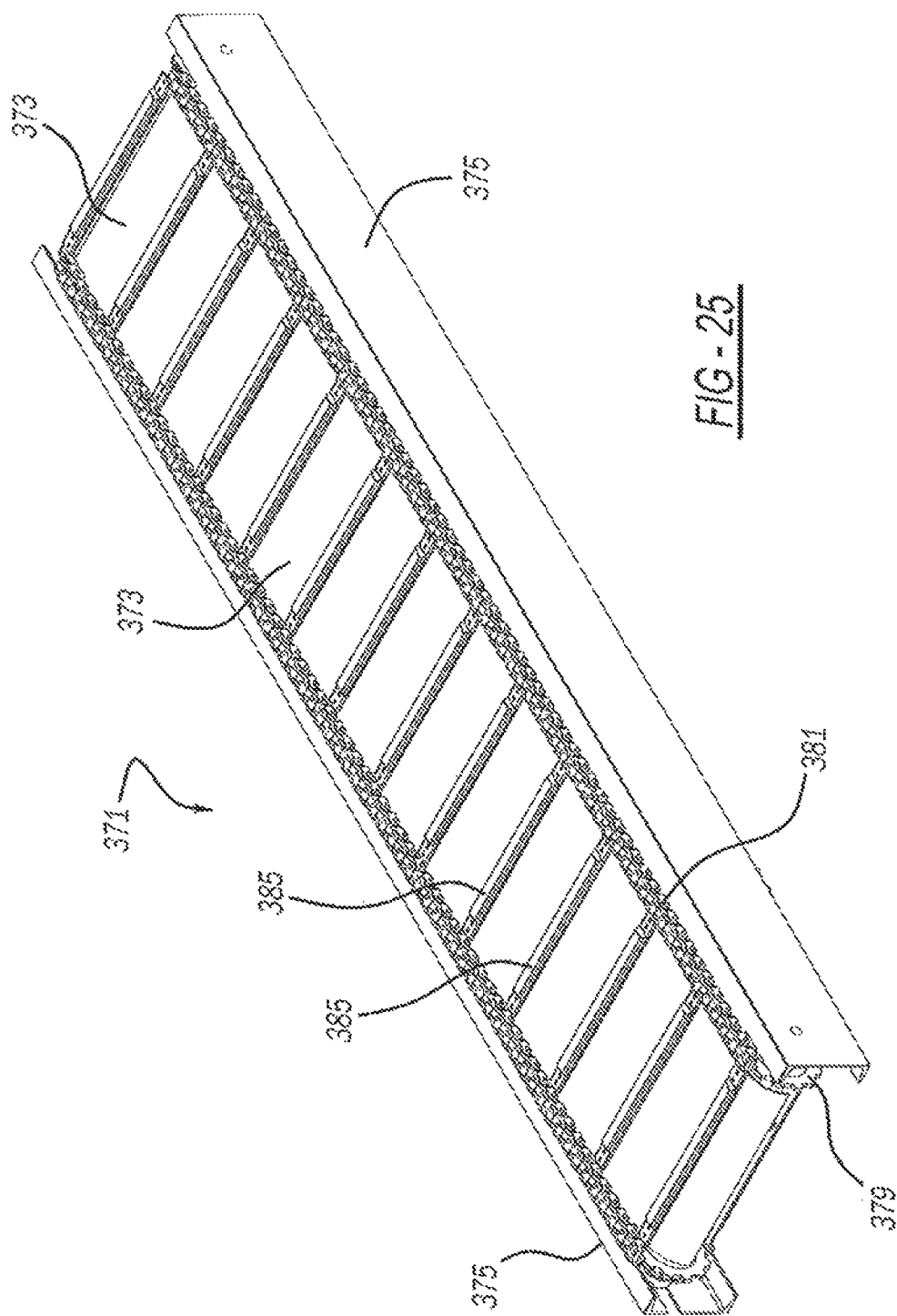
FIG. 25 is a perspective view showing one of the conveyors employed in the conveyor table assembly of the second embodiment machine.
Figure 28:
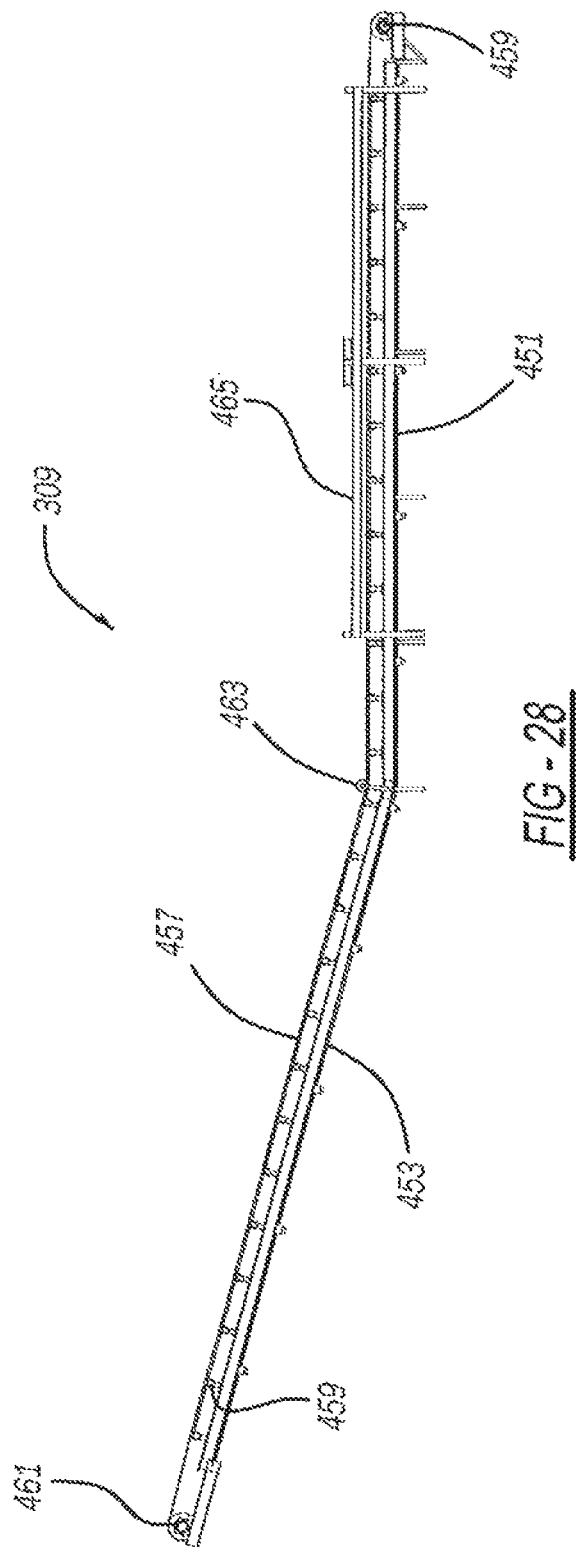
FIG. 28 is a side elevational view showing the dirt removal station of the second embodiment machine.

FIG. 11 illustrates end doors 335 lowered and aligned with ramps 337 so that truck and trailer 343 can drive up the entry ramp and onto bed 331. Subsequently, FIGS. 12, 15 and 17 illustrate truck and trailer 343 moved onto bed 331 such that entry door 335 is raised and the truck driver hydraulically raises a front of trailer 343 to dump the tuberous sugar beets 351 from a rear swinging door of the trailer directly onto the bed. Next, FIG. 13 illustrates truck and trailer 343 driving off of the exit ramp 337 such that exit door 335 is also upwardly rotated to entirely close the sides and ends of receiving station 303. This condition is also illustrated in FIGS. 19 and 20. FIGS. 14 and 21 show bed 331, side walls 333 and raised end walls 335 upwardly rotated about a horizontal and inboard axis 353 by multiple hydraulic actuators 355, each having an associated internal piston and extending piston rod coupled to a stationary ground-located frame 357. After all of the sugar beets have been dumped from receiving station 303, bed 331 is rotated back to its lowered and nominal position, whereafter end doors 335 are downwardly rotated to allow entry of a subsequent truck and trailer.

One or more load cells 359 is located between a portion of frame 357 and bed 331. Load cells 359 are electrically coupled to a scale used to weigh the intermixed sugar beets and dirt dumped within receiving station 303.

Referring to FIGS. 10, 11, 15-17, 22, 25 and 26, feed conveyor table assembly 305 is laterally located between the inboard side of receiving station 303 and the leading edge of cleaning station 307. Feed conveyor table assembly 305 includes at least one, and more preferably eight, separate drag conveyor cartridges 371, each having an endless belt 373, laterally elongated opposite frames 375, a hydraulic motor 377, sprockets 379 driven by motor 377, and chains 381 driven by sprockets 379. Furthermore, multiple raised bars 385 are connected to and span across belt 373 in a parallel and spaced apart arrangement. The multiple cartridges 371 are attached together across the longitudinal length of feed conveyor table assembly 305 between upstanding and fixed sidewalls 387 mounted above the ground. In use, beets 351 intermixed with the dirt are dumped from bed 331 onto feed conveyor belts 373 which horizontally move the beets onto cleaning station 307.

Reference should now be made to FIGS. 11, 17, 23 and 24. Cleaning station 307 includes symmetrical and mirror imaged left and right roller modules 401 and 403, respectively, which are separated by a central transfer conveyor 405. A hydraulic cylinder actuator 407, containing a piston and extending piston rod, couple a frame 409 of each roller module to a frame 411 of central transfer conveyor 405 such that upon piston retraction, modules 401 and 403 can be moved from their nominal usage positions illustrated in FIG. 23, to an upwardly rotated position (not illustrated) to facilitate easy movement of the cleaning station onto a flat bed wheeled trailer for transportation to a different beet pile site or for maintenance at a remote indoor facility.

Each roller module 401 and 403 includes leading grab rollers 413 which are rotated by hydraulic, or alternately electric, motor actuators 415. Furthermore, a first set of cleaning rollers 417 each have spiral flighting 419, also known as raised threads, angled diagonally toward outboard directions as can best be observed in FIG. 24. A second set of oppositely rotated cleaning rollers 421 have spiral flighting or threads 419 but in an opposite diagonal angle as compared to the flighting for rollers 417. Rollers 417 and 421 are driven by their respective hydraulic or electric motor actuators 423. Rotational axes for all of rollers 413, 417 and 421 are generally parallel to each other in the longitudinal direction which is parallel to the driving direction of the trailers through the receiving station. Additionally, the axes of rollers 421 are higher off the ground than those of rollers 419 which, in turn, are higher than those of rollers 413.

Each adjacent pair of rollers 417 and 421 are spaced apart from each other so as to allow dirt to fall therebetween as it is removed from sugar beets 351 during their rotational tumbling thereon. Moreover, sugar beets 351 are laterally moved from feed conveyor table assembly 305 onto grab rollers 431 which then tumble and laterally move the beets onto first set of spiral rollers 417. The flighting angle causes the sugar beets to move in a somewhat semicircular path from a central area of the cleaning station toward longitudinally outboard portions of the rollers 417 adjacent frames 409. Thereafter, as the sugar beets are tumbled from the first of the spiral rollers 417 to the second set of spiral rollers 421, the flighting on the second set of rollers 421 causes the sugar beets to longitudinally move back toward central conveyor 405.

Central conveyor 405 includes endless chains or a belt 431 up from which project fingers 433 or ribs in a spaced apart and generally parallel arrangement. A hydraulic or electric motor actuator moves chains 431 upon powered internal sprockets or rollers 435. Thus, the cleaned beets move from inner ends of cleaning rollers 421 onto chains 431 which then move the beets in a diagonally upward direction for placement onto main piling conveyor 311. It is noteworthy that the station-to-station transfers and tumbling of the beets is generally gentle throughout the entire process to minimize bruising and damage to the beets.

Dirt transporter station 309 is shown in FIGS. 10, 14, 17, 18, 27 and 28. Dirt transporter station 309 includes a lower conveyor segment 451, a dirt transporter segment 453, and a moveable segment 455. Segments 451 and 453 consist of a continuously looped conveyor belt 457 located upon a set of internal rollers 459 and driven by a hydraulic motor actuated head pulley or roller 461. A hold-down pulley or roller 463 is located adjacent a joint or intersection between generally horizontally elongated segment 451 and upwardly diagonal segment 453. Rollers 459 and 461 are all coupled to a stationary frame 465 upon which cleaning station 307 is mounted. Thus, a majority of conveyor belt 457 at longitudinally elongated lower segment 451 is located directly below the cleaning rollers of cleaning station 307 to allow dirt to fall directly from the sugar beets onto belt 457.

Figure 18:
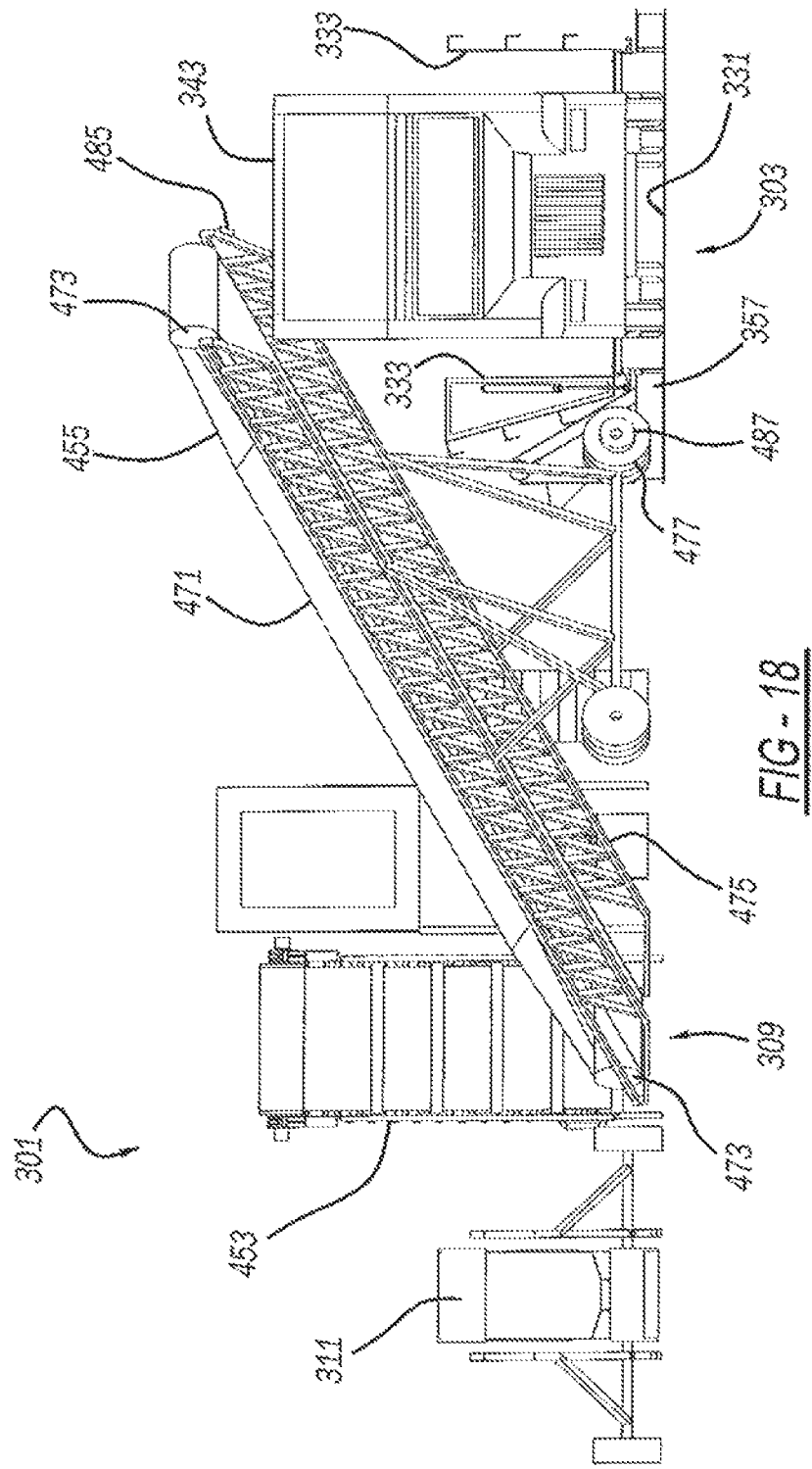
FIG. 18 is an end elevational view, taken opposite that of FIG. 17, showing the second embodiment machine.

Segment 455 is a diagonally raised conveyor including an endless conveyor belt 471 rotated upon rollers 473 at least one of which is driven by a hydraulic or electric motor actuator. Rollers 473 are rotatably mounted upon a portable and mobile frame 475 upon which are powered wheels 477. A hydraulic or electric motor is used to drive wheels 477 in order to swing or rotate the raised distal end of segment 455 from its retracted position shown in FIG. 11 to its unloading position above trailer 343 as shown in FIGS. 10 and 18. A distal end of segment 453 overlaps a proximal and lowered end of segment 455 such that dirt transported along belt 457 falls onto belt 471 and then is unloaded and dumped into the trailer at a location remote and spaced apart from receiving station 303. Thus, this allows for improved efficiencies since beets can be offloaded in the receiving station by one trailer while the previously dumped dirt can be placed back into a different trailer by the dirt transporter station. Optionally, a load cell or other scale may be placed on either a segment of dirt transporter station 309 or on the ground below the trailer 343 after the dirt is unloaded therein. A centralized computer controller will then automatically calculate the difference in the combined beets and dirt in the receiving station versus the removed dirt so as to calculate the cleaned beet value actually unloaded.

Moreover, one or more optical sensors 485 are mounted adjacent the distal end of dirt transporting frame 475. Sensor 485 senses if trailer 343 is in a proper dirt unloading position. If a computer controller automatically determines that a trailer is in the correct position then the controller will automatically cause energization of motor 487 which drives wheels 477 and rotates conveyor segment 455 between its retracted and advanced (dirt unloading) positions, and then causes conveyor belt movement to offload the dirt.

Figure 29:
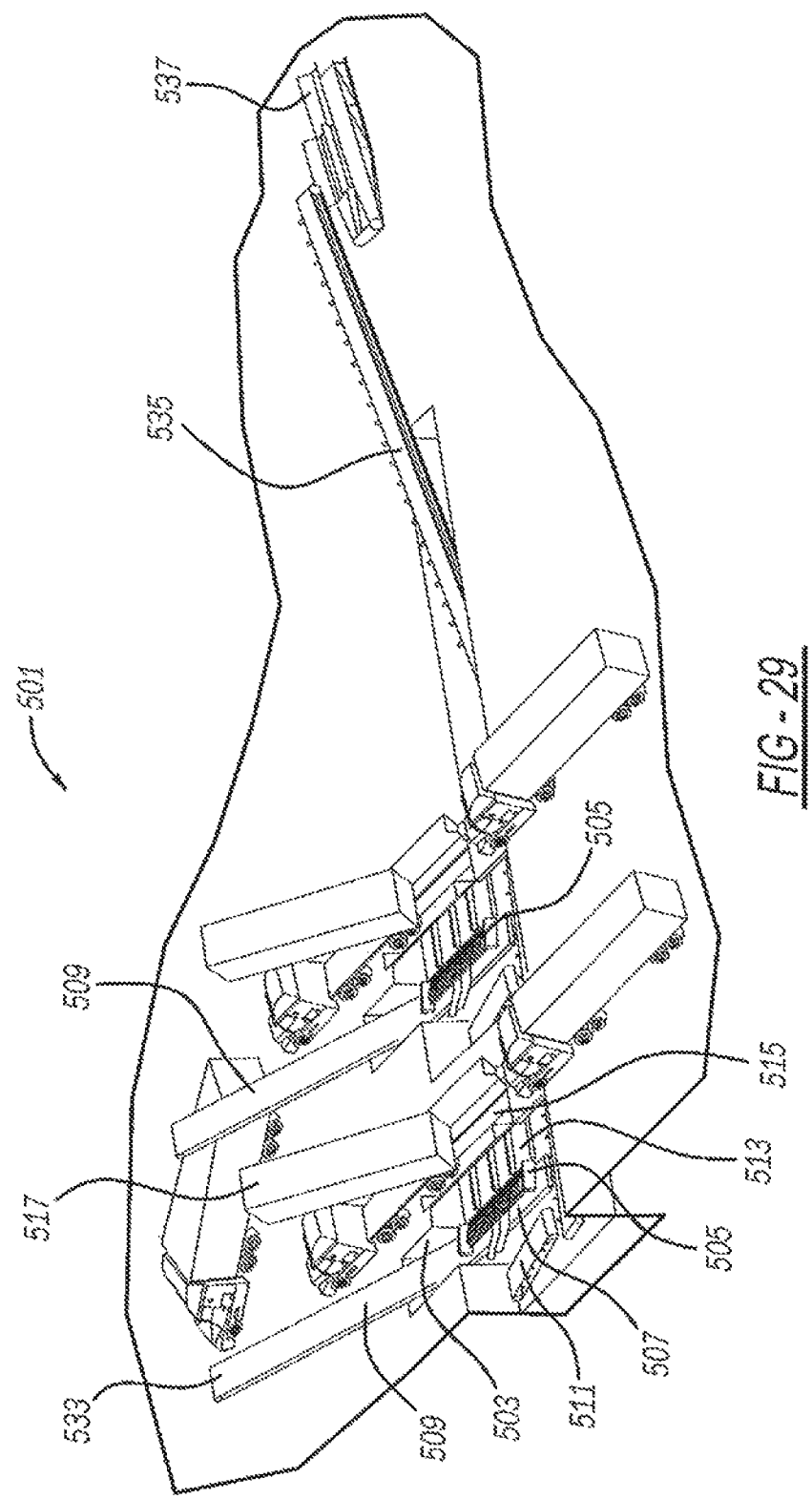
FIG. 29 is a perspective view showing a third embodiment of the dirt removal and piling machine.
Figure 30:
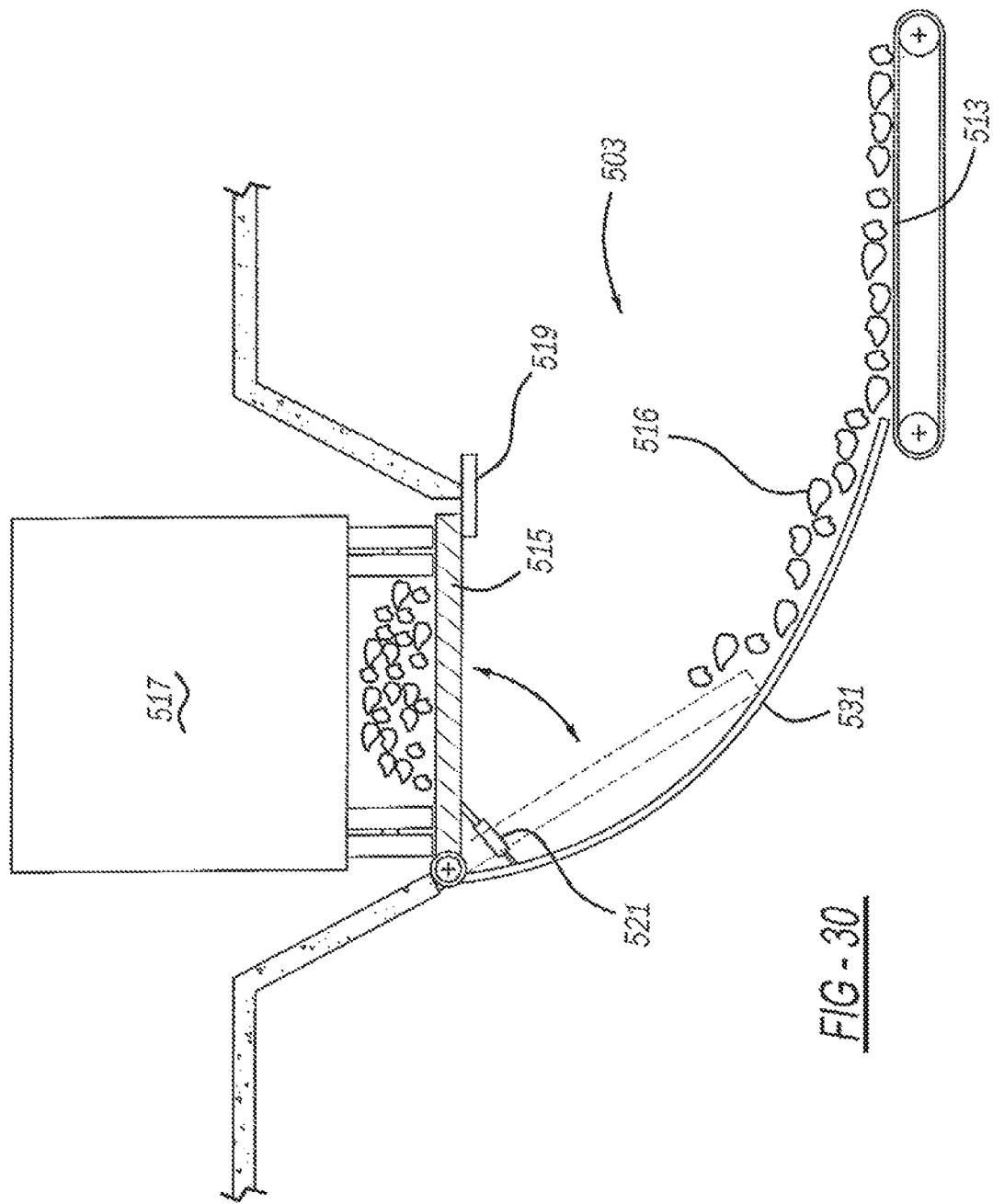
FIG. 30 is a diagrammatic, cross-sectional view showing the third embodiment of the dirt removal and piling machine.

Reference should now be made to FIG. 29 which shows a third exemplary embodiment of a dirt removal and piling machine 501. This configuration employs a below-ground or subterranean pit 503 within which is located cleaning station 505, horizontal segment 507 of dirt transporter station 509 and an initial main piling conveyor 511. A generally horizontal feeding conveyor table assembly 513 is also optionally located within pit 503. A bed 515 is either at ground level or preferably depressed below ground level, as is shown in FIG. 30. After a vehicular trailer 517 dumps the sugar beets onto bed 515 and drives off of the bed, a latch 519 is released to allow a hydraulic actuator 521 to openly rotate bed 515. This allows beets 516 to downwardly fall and slide along a chute 531 and then onto feeding conveyor table station 513. Upwardly raised segment 533 of dirt transporter station 509 will remove the dirt from within the pit below the cleaning rollers for unloading into trailer 517. Moreover, initial conveyor 511 of each receiving and cleaning site will transfer the cleaned beets from each cleaning station 505 onto a main piling conveyor 535, a first segment of which is in an intersecting channel of pit and a distal segment of which diagonally rises above the ground surface for dropping the beets onto a subsequent telescopic piling conveyor 537 which may rotate its distal end back and forth to create the unloaded pile. The stations are otherwise the same as the second embodiment. Two adjacent and generally parallel receiving, cleaning and dirt removal sites are illustrated in FIG. 29 while five are illustrated in FIG. 31. It is envisioned that the pit configuration of FIG. 31 can handle at least twelve times the sugar beet receiving, cleaning and piling throughput as compared to traditional piler devices.

While various aspects of the present machine have been disclosed, other features may alternately be included. For example, conveyor belts may be replaced by multiple powered rollers or chains, or vice versa. Furthermore, the bed of the receiving station may alternately tilt about an arcuate path and/or a vertically raised and then rotated path rather than a single pivot axis, although various benefits may not be achieved. Moreover, the quantity and length of the cleaning rollers can be different, but certain advantages may not be realized. Features of one embodiment may be interchanged and/or substituted with those of the other embodiments, and the dependent claims can be multiply dependent on each other in all possible combinations of intermediate scope. It is intended by the following claims to cover these and any other departures from the disclosed embodiments which fall within the true spirit of this invention.

The invention claimed is:

1. A dirt removal and piling machine comprising:
   (a) a workpiece-receiving station comprising:
   at least one end ramp aligned along a longitudinal dump truck-movement direction, and a bed elongated along the dump truck-movement direction;
   sidewalls upstanding from inboard and outboard edges of the bed; an actuator operably tilting the bed about at least an inboard and horizontal axis which is substantially parallel to the dump truck-movement direction; and (b) a workpiece-cleaning station located inboard of the bed, the cleaning station comprising workpiece-contacting rollers;

(c) a dirt transporter including a stationary frame and a moveable section coupled to said frame, the dirt transporter being capable of receiving dirt removed from workpieces in the cleaning station, and transporting the dirt to a remote location;

(d) said machine being configured to allow a vehicular trailer to dump the workpieces and dirt at the receiving station, and the trailer receives the dirt from the transporter at the remote location after the dirt is separated from the workpieces; and (e) said moveable section of said dirt transporter comprising an elongated conveyor which includes a substantially horizontal segment located below at least a portion of the cleaning station, and the conveyor of the dirt transporter including a diagonally raised segment spanning between the horizontal segment and the trailer.

2. A dirt removal and piling machine comprising:

(a) a workpiece-receiving station comprising:

at least one end ramp aligned along a longitudinal dump truck-movement direction, and a bed elongated along the dump truck-movement direction;

sidewalls upstanding from inboard and outboard edges of the bed; an actuator operably tilting the bed about at least an inboard and horizontal axis which is substantially parallel to the dump truck-movement direction;

(b) a workpiece-cleaning station located inboard of the bed, the cleaning station comprising workpiece-contacting rollers, wherein said rollers of the cleaning station comprise spaced apart and parallel rollers, at least a majority of the rollers each including a spiral flighting to longitudinally move workpieces between outboard ends thereof while rotating the workpieces;

(c) a piling conveyor;

(d) a discharge transporter; and wherein some of said rollers of the cleaning station rotate in an opposite direction from others of said rollers to first move the workpieces toward the outboard ends and subsequently move the workpieces toward a centerline of the cleaning station where the discharge transporter moves the cleaned workpieces to the piling conveyor.

3. A dirt removal and piling machine comprising:

(a) a workpiece-receiving station comprising:

at least one end ramp aligned along a longitudinal dump truck-movement direction, and a bed elongated along the dump truck-movement direction;

sidewalls upstanding from inboard and outboard edges of the bed; an actuator operably tilting the bed about at least an inboard and horizontal axis which is substantially parallel to the dump truck-movement direction; and (b) a workpiece-cleaning station located inboard of the bed, the cleaning station comprising workpiece-contacting rollers; said-machine further comprising:

(c) a substantially horizontal feed conveyor table located between said receiving station and said cleaning station, said bed of said receiving station being capable of dumping tuberous crop workpieces onto said feed conveyor table for subsequent movement of the workpieces to the cleaning station in a direction substantially perpendicular to said bed tilting axis.

4. A dirt removal and piling machine comprising:

(a) a tuberous crop-cleaner comprising rotating rollers capable of tumbling tuberous crops and removing dirt therefrom;

(b) a dirt-removal conveyor having an elongated section located below the rollers; and (c) a dirt-transporter located adjacent a distal end of the dirt-removal conveyor, the dirt-transporter comprising a stationary frame and a moveable section coupled to the frame, and the dirt-transporter being capable of transporting and then dumping the dirt into a mobile trailer; and (d) an elongated piling conveyor being capable of receiving the cleaned tuberous crops and piling them:

said machine further comprising:

(e) a moveable bed;

(f) a substantially horizontal feed conveyor assembly located between said bed and the cleaner; and said bed being capable of dumping the tuberous crops onto said feed conveyor assembly for subsequent movement of the tuberous crops to said cleaner in a direction substantially perpendicular to rotational axes of at least a majority of said rollers of the cleaner.

5. The machine of claim 4, further comprising:

a first scale coupled to the bed to weigh the tuberous crops and the dirt before the bed is tilted; and a second scale weighing the dirt removed from the tuberous crops.

\* \* \* \* \*